(12) United States Patent
Padmanabhan et al.

(10) Patent No.: US 10,375,211 B2
(45) Date of Patent: Aug. 6, 2019

(54) OPTIMIZATION OF USER INTERFACE DATA TRANSMISSION FOR A CONSISTENT MULTI-PLATFORM EXPERIENCE SERVICE DELIVERY

(71) Applicant: eBay Inc., San Jose, CA (US)

(72) Inventors: Senthil Kumar Padmanabhan, San Jose, CA (US); Louis Perrochon, Mountain View, CA (US); Chuck Qun Zheng, San Jose, CA (US)

(73) Assignee: eBay Inc., San Jose, CA (US)

( * ) Notice: Subject to any disclaimer, the term of this patent is extended or adjusted under 35 U.S.C. 154(b) by 185 days.

(21) Appl. No.: 15/173,483

(22) Filed: Jun. 3, 2016

(65) Prior Publication Data

US 2017/0353583 A1  Dec. 7, 2017

(51) Int. Cl.
*G06F 13/00* (2006.01)
*H04L 29/06* (2006.01)
(Continued)

(52) U.S. Cl.
CPC ............... *H04L 67/42* (2013.01); *G06F 8/34* (2013.01); *G06F 8/60* (2013.01); *G06F 9/451* (2018.02);
(Continued)

(58) Field of Classification Search
CPC ............ H04L 29/08072; H04L 29/06; H04L 29/0809; H04L 29/06047; H04L 12/581;
(Continued)

(56) References Cited

U.S. PATENT DOCUMENTS

2003/0028899 A1   2/2003   Macinnis
2009/0228519 A1   9/2009   Purcell et al.
(Continued)

FOREIGN PATENT DOCUMENTS

WO   2017/210175 A1   12/2017

OTHER PUBLICATIONS

International Search Report and Written Opinion received for PCT Application No. PCT/US2017/034974, dated Aug. 24, 2017, 7 pages.
(Continued)

*Primary Examiner* — Robert B Harrell
(74) *Attorney, Agent, or Firm* — SBMC

(57) ABSTRACT

Methods, systems, and computer programs are presented for optimizing data delivery for a User Interface (UI) to a plurality of device types. One method includes operations for receiving at a server a request for an update to the UI of a client device, and for determining, by an orchestrator at the server, modules associated with the request, each module being presented on the UI. Further, the method includes operations for invoking domain services based on the determined modules (each domain service returning respective domain service data), and for synthesizing the domain service data to generate module data for each module. The synthesizing includes selecting from the domain service data and combining the selected domain service data to generate the module data. The module data is transmitted to the client device for all the modules, the module data being processable by the client device to update modules of the UI.

20 Claims, 15 Drawing Sheets

(51) Int. Cl.
*G06F 9/451* (2018.01)
*G06Q 30/06* (2012.01)
*H04L 29/08* (2006.01)
*H04W 4/18* (2009.01)
*G06F 8/34* (2018.01)
*G06F 8/60* (2018.01)

(52) U.S. Cl.
CPC ......... *G06Q 30/0643* (2013.01); *H04L 67/04* (2013.01); *H04L 67/16* (2013.01); *H04L 67/32* (2013.01); *H04W 4/18* (2013.01)

(58) Field of Classification Search
CPC . H04L 12/1813; H04L 12/1822; H04L 67/04; H04L 67/16; H04L 67/32; G06Q 30/02; G06Q 30/0605; G06Q 10/06; G06Q 10/10; G06Q 10/107; G06Q 10/109; G06Q 10/0631; G06Q 10/0633; G06Q 10/06316; G06Q 30/06; G06Q 30/0601; G06Q 30/0619; G06Q 30/0633; G06Q 30/0635; G06Q 30/0641; G06Q 30/0643; G06F 3/48; G06F 3/481; G06F 8/34; G06F 8/60; G06F 9/44; G06F 9/451; G06F 9/452; G06F 9/4445; G06F 13/00; G06F 16/00; G06F 17/24; G06F 17/30; G06F 17/211; G06F 17/245; G06F 17/246; G06F 17/2247
USPC ............ 709/203; 705/26; 715/212, 751, 753
See application file for complete search history.

(56) References Cited

U.S. PATENT DOCUMENTS

2013/0086483 A1    4/2013   Vainer et al.
2014/0033184 A1    1/2014   Pendergrass et al.
2015/0178052 A1    6/2015   Gupta et al.
2016/0239885 A1*   8/2016   Goolsby ............ G06Q 30/0605

OTHER PUBLICATIONS

International Preliminary Report on Patentability received for PCT Application No. PCT/US2017/034974, dated Dec. 13, 2018, 7 pages.

* cited by examiner

Module Selection Table 1002

| View | Market-place | User Segment | EP | Device/App | Modules |
|---|---|---|---|---|---|
| My Shop | All | All | All | Desktop | M1, M2, M3 |
| My Shop | US | TopBuyer | All | Phone (mWeb) | M1, M4, M7 |
| My Shop | Germany | All | Treatment 1 | Tablet | M8, M9 |
| Following | India | Newbie | All | myShop iphone 2.3.0 | M2, M14, M5 |

Fig. 10

Domain Service Selection Logic 1102

| Module | Domain Service 1 | Domain Service 2 | Domain Service 3 | Domain Service 4 | Domain Service 5 |
|---|---|---|---|---|---|
| M1 |  | 1 | 2 | 1 |  |
| M2 | 1 |  |  |  | 1 |
| M3 | 2 |  | 3 | 1 |  |
| M4 |  | 1 |  |  | 1 |
| ⋮ | | | | | |

Fig. 11

OPTIMIZATION OF USER INTERFACE DATA TRANSMISSION FOR A CONSISTENT MULTI-PLATFORM EXPERIENCE SERVICE DELIVERY

TECHNICAL FIELD

The subject matter disclosed herein generally relates to methods, systems, and programs for optimizing data delivery for a User Interface (UI) to a plurality of device types.

BACKGROUND

In today's multi-platform computing environments, service providers want to deliver services to a plurality of different devices, which requires having multiple development teams writing code for the different computing platforms. Having multiple teams increases the cost and complexity of supporting services delivered over the Internet.

For example, some services require support for multiple client applications written in multiple programming languages, such as Objective-C, Java, and JavaScript, which often results in a different design and implementation for each team. This creates problems for the service provider, such as duplicate the efforts across the multiple client applications, delays in time-to-market for new features, inconsistent user experience regarding data presented and the look-and-feel of the user interface, inefficient use of limited engineering development resources, etc.

It is in this context that embodiments arise.

BRIEF DESCRIPTION OF THE DRAWINGS

Various ones of the appended drawings merely illustrate example embodiments of the present disclosure and cannot be considered as limiting its scope.

FIG. 10 is an example module selection table, according to some example embodiments.

FIG. 11 is a table illustrating the domain-service selection logic based on the module, according to some example embodiments.

DETAILED DESCRIPTION

Figure 1:
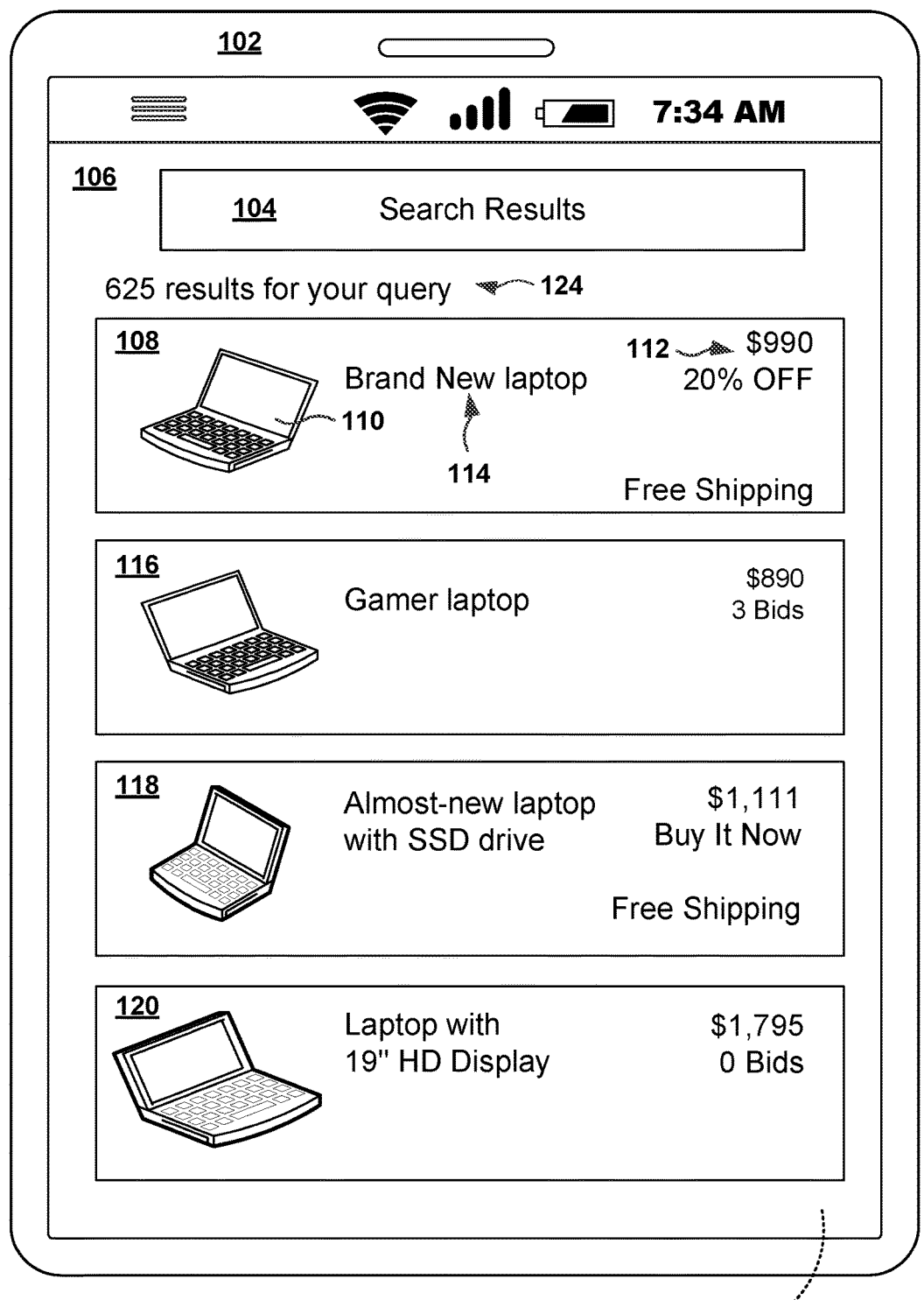
FIG. 1 is a screenshot of user interface (UI) for an electronic commerce application, according to one example embodiment.

Example methods, systems, and computer programs are directed to optimizing data transmission for a user interface to deliver a consistent multi-platform experience service. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Oftentimes, electronic commerce solutions include a client application that provides an easy-to-use user interface (UI). Sometimes, to present a small amount of information on the UI, the client application must request a large amount of data from service entities that deliver pieces of the complete solution required for presenting on the UI. The client application must then process a large amount of data to synthesize the data into a viewable item. As a result, the client application must be designed taking into consideration multiple services with multiple APIs and data structures. It is noted that some example embodiments are presented herein with reference to an electronic commerce application, but the principles presented herein may be utilized in any service that drives a UI and is delivered over a network.

Example embodiments presented herein reduce the complexity of developing client applications by introducing orchestration services that provide a consistent interface across all client devices. The orchestration services process requests and invoke the different services within the server, to compile the data required for the user interface on the client. The orchestration services then transmit the required data, also referred to as render-ready data or module data, to the client device without having to transmit all the information provided by the different services.

As a result, the complexity of developing, and modifying, client applications is greatly reduced and the ability to provide a consistent user interface is greatly enhanced. Further, the amount of data transmitted over the network is greatly reduced, which could be a critical factor in low-bandwidth environments. Further yet, the optimized approach allows delivery of a consistent and uniform user experience.

Further, since the orchestration services at the server are client aware, it is possible to customize the experience and the data transmitted, according to the type of client. For example, desktops usually do not have a camera, but mobile devices usually have cameras, therefore, the orchestration services will not deliver camera-dependent services to the desktop but will for a mobile device.

One general aspect includes a method including an operation for receiving at a server, from a client device, a request for an update to a user interface (UI) of the client device. The method also includes determining, based on the request by an orchestrator at the server, one or more modules of the UI, and invoking, by the orchestrator, one or more domain services based on the determined modules, each domain service returning respective domain service data. The method also includes synthesizing the domain service data returned by the one or more domain services to generate module data for each module, where the synthesizing includes selecting from the domain service data and combining the selected domain service data to generate the module data, and transmitting to the client device the module data for the modules, where transmitting the module data causes an update of the modules of the UI.

One general aspect includes a server that includes a communications interface for receiving a request for an update to a user interface (UI) of a client device, a memory with instructions of an orchestrator program; and one or more computer processors. The instructions, when executed by the one or more computer processors, cause the one or more computer processors to determine one or more modules based on the request and a module selection table stored in the memory, each module being part of the UI, and to invoke one or more domain services based on the determined modules, each domain service returning respective domain service data. The one or more computer processors also synthesize the domain service data returned by the one or more domain services to generate module data for each module, where the synthesis includes selecting from the domain service data and combining the selected domain service data to generate the module data. The one or more computer processors also transmit, via the communications interface, to the client device the module data for the modules, where transmitting the module data causes an update of the modules of the UI.

One general aspect includes a non-transitory machine-readable medium including a set of instructions that, when executed by a machine, causes the machine to perform a set of operations including, receiving at a server, from a client device, a request for an update to a user interface (UI) of the client device, and determining, based on the request by an orchestrator at the server, one or more modules of the UI. Determining the modules further includes selecting an entry in a module selection table based on the request (the module selection table includes a plurality of fields that include a marketplace field, a device type field, and a modules field), and selecting the modules to be invoked according to the modules identified in the modules field of the selected entry. The machine invokes, by the orchestrator, one or more domain services based on the determined modules, each domain service returning respective domain service data. The machine also synthesizes the domain service data returned by the one or more domain services to generate module data for each module, where the synthesis includes selecting from the domain service data and combining the selected domain service data to generate the module data. The machine further transmits to the client device the module data for the modules, where transmitting the module data causes an update of the modules of the UI.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the present subject matter will be described with reference to specific example embodiments, various modifications and changes may be made to these example embodiments without departing from the broader scope of embodiments of the present disclosure. Such example embodiments of the present subject matter may be referred to herein, individually or collectively, by the term "invention" merely for convenience and without intending to voluntarily limit the scope of this application to any single disclosure or present concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

FIG. 1 is a screenshot of user interface (UI) for an electronic commerce application, according to one example embodiment. The client device 102 includes a display 106 where user interface 122 is presented. In the example embodiment of FIG. 1, a screenshot is presented of a sale application that allows the user to search and browse through items for sale.

The UI 122 includes a search bar 104 for entering search terms. A search-summary message 124 indicates how many items satisfying the search query have been found. Below, a plurality of items for sale 108, 116, 118, and 120 are presented. Each item includes an image 108 of the item (if an image is not available, and icon may also be presented), a description 114 of the item, and price information 112. The price information 112 includes one or more of a price (e.g., buy now), a highest bid on an auction, a seller discount available, a shipping cost, a number of bids, or a time when the auction ends, or any combination thereof.

In some implementations, presenting the item information requires gathering a large amount of data from multiple services. In general, the services (e.g., seller information service, item information service, user information service) support application programming interfaces (API) that enable the client to request and receive data. However, many APIs tend to return a large amount of data, often much more data than is needed for updating the UI.

To present the information, the client-application programmer has to understand all the different APIs that must be accessed, including all the data returned by the services The data has to be parsed and synthesized, to end up presenting a relatively small amount of information for a given item.

This means that the client must perform a large amount of processing, which could cause the application to appear slow or sluggish. Also, each client application is typically developed by a different team that is familiar with the client device, resulting in multiple implementations that tend to be somewhat inconsistent. The different development teams have to replicate the same logic on the multiple programming platforms.

Figure 2:
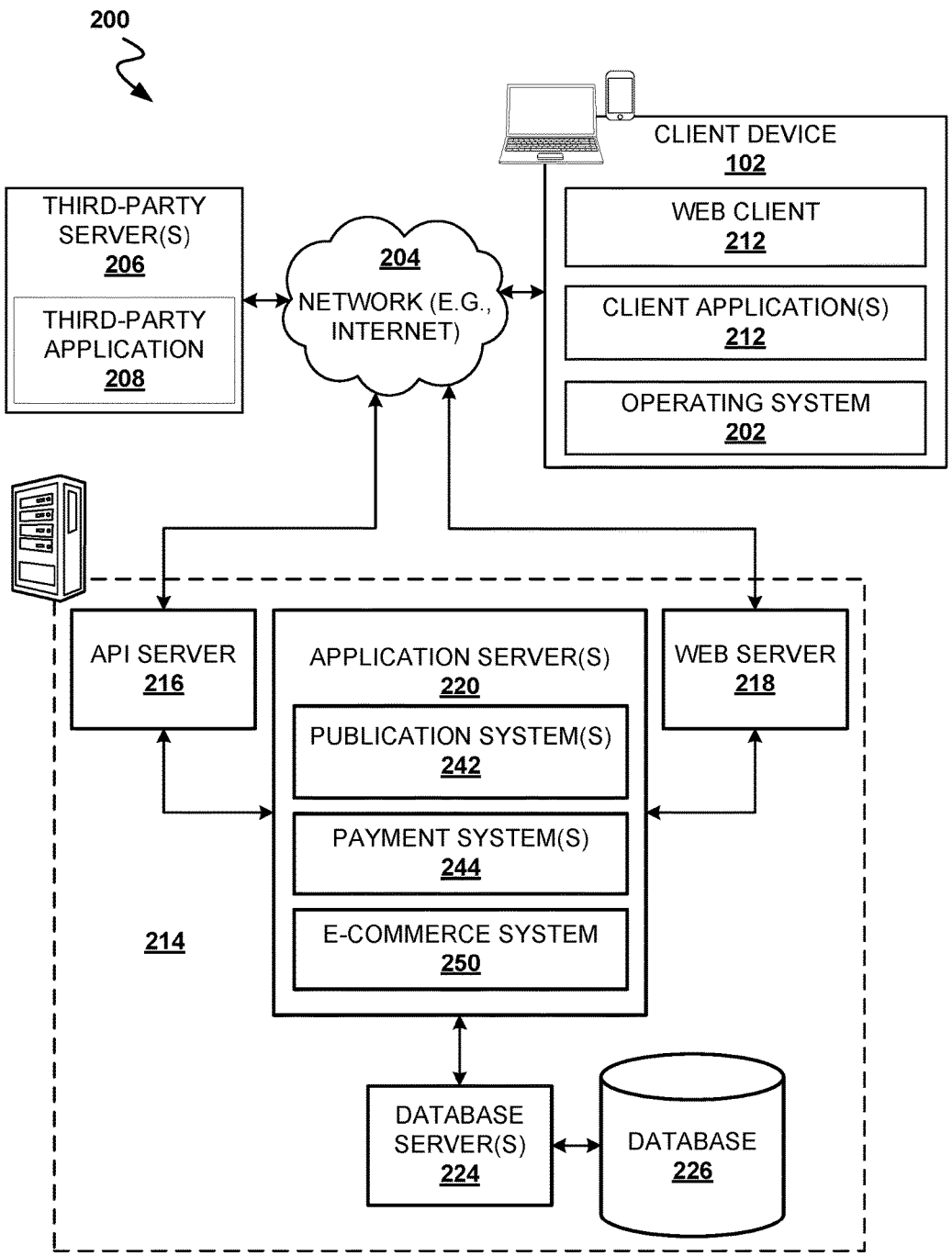
FIG. 2 is a block diagram illustrating a networked architecture, according to some example embodiments.

FIG. 2 is a block diagram illustrating a network architecture 200, according to some example embodiments. FIG. 2 is an example embodiment of a high-level network architecture 200 of an electronic commerce system 214. The electronic commerce system 214 provides server-side functionality via a network 204 (e.g., the Internet or wide area network (WAN)) to a client device 102. A web client 210 and a programmatic client, in the example form of a client application 212, are hosted and execute on the client device 102. The electronic commerce system 214 includes application server 220(s), which host multiple systems, including publication system 242, payment system 244, and e-commerce system 250.

The client application 212 also provides a number of interfaces described herein, which present output of the electronic commerce application for the user of the client device 102. The client device 102 enables a user to access and interact with the electronic commerce system 214. For instance, the user provides input (e.g., touch screen input or alphanumeric input) to the client device 102, and the input is communicated to the electronic commerce system 214 via the network 204. In this instance, the electronic commerce system 214, in response to receiving the input from the user, communicates information back to the client device 102 via the network 204 to be presented to the user.

An Application Program Interface (API) server 216 and a web server 218 are coupled to, and provide programmatic and web interfaces respectively, to the application server(s) 220. The application server(s) 220 hosts a electronic commerce system 214, which includes components or applications. The application server(s) 220 is, in turn, shown to be coupled to a database server(s) 224 that facilitates access to information storage repositories (e.g., database 226). In an example embodiment, the database 226 includes storage devices that store information accessed and generated by the electronic commerce system 214.

Additionally, a third party application 208, executing on a third party server(s) 206, is shown as having programmatic access to the electronic commerce system 214 via the programmatic interface provided by the Application Program Interface (API) server 216. For example, the third party application 208, using information retrieved from the electronic commerce system 214, may support one or more features or functions on a website hosted by the third party.

Turning now specifically to the applications hosted by the client device 102, the web client 210 may access the various systems (e.g., electronic commerce system 214) via the web interface supported by the web server 218. Similarly, the client application 212 (e.g., an "app") accesses the various services and functions provided by the electronic commerce system 214 via the programmatic interface provided by the Application Program Interface (API) server 216. The client application 212 may be, for example, an "app" executing on a client device 102, such as an iOS or an Android OS application, to enable the user to access and input data on the electronic commerce system 214 in an off-line manner, and to perform batch-mode communications between the client application 212 and the electronic commerce system 214.

Further, while the network architecture 200 shown in FIG. 2 employs a client-server architecture, the present subject matter is of course not limited to such an architecture, and could equally well find application in a distributed, or peer-to-peer, architecture system, for example. The electronic commerce system 214 could also be implemented as a standalone software program, which does not necessarily have networking capabilities.

Figure 3:
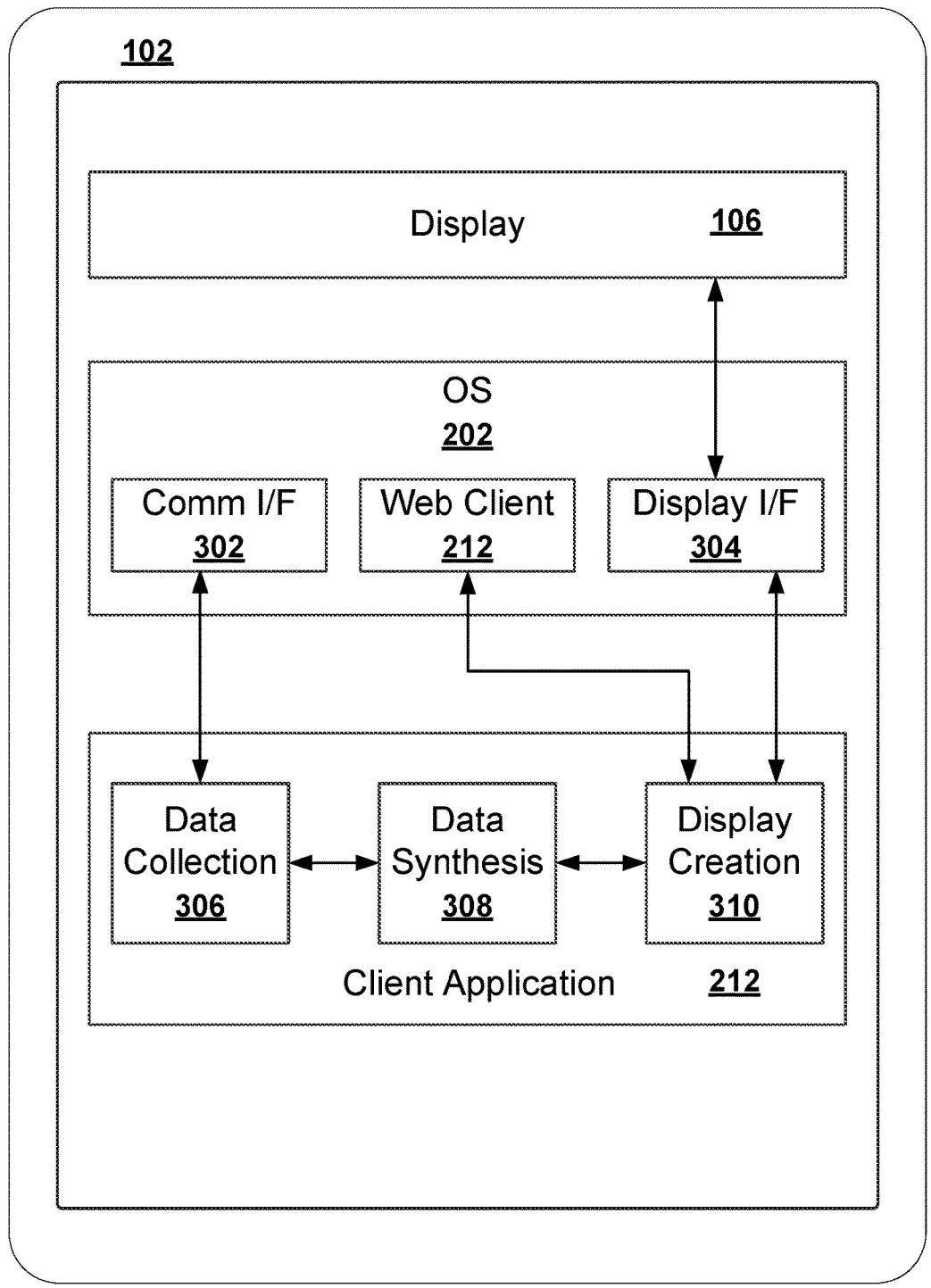
FIG. 3 illustrates an architecture of a mobile device, in accordance with some example embodiments.

FIG. 3 illustrates the architecture of a mobile device 102, in accordance with some example embodiments. The operating system 202 includes a communication interface 302 that provides communication capabilities, such as cellular, WiFi, or Bluetooth connections, to the applications executing in the client device 102. A web client 212 provides, among other things, a browser interface for accessing the Internet. Further, display interface 304 enables the applications executing on the client device 102 to present visual information on the display 106.

The client application 212 interfaces with the operating system 202 of the client device 102 to deliver e-commerce services. The client application 212 includes data collection unit 306, data synthesis unit 308, and display creation unit 310. Data collection unit 306 accesses data from the remote server via communications interface 302 (e.g., via WiFi) to obtain the raw data for the UI presented on the display. Data synthesis unit 308 synthesizes all the data collected by data collection 306 to identify or calculate the data required for the UI. Display creation unit 310 formats the synthesized data to create the UI, and sends the data to display interface 304 for presentation of the UI on display 106.

It is noted that the UI may include one or more modules, and the server determines which modules are required to update the UI. As used herein, a module is a component of the UI and is used to present a predefined set of data within the UI. Thus, the UI may include one or more modules, and updating the modules results in updates to the UI. It is possible to update one module of the UI while not updating another module. Thus, modules may be independent from other modules, though, some modules may have interdependencies with other modules.

In some example embodiments, the server accesses one or more domain services to obtain the data required to update the one or more modules. Some of the modules may require data from one domain service (e.g., user service, order service, product service, listing service, seller service) while other modules may require data for more than one domain service. In one example electronic commerce operation, the client device requires access to three different domain services, because each domain service provides a different piece of information. For example, to present an item that is for sale on the UI, the client device needs data from three different services: user service, item service, and seller service.

However, if the UI only requires the item image and the item description, a call to the item service may return a large amount of data, such as ID of the seller, minimum price, fixed price, current bid, discounts, technical details, client rating, etc. The data synthesis unit 308 has to analyze the raw data and select what is needed for presentation on the display.

Figure 4:
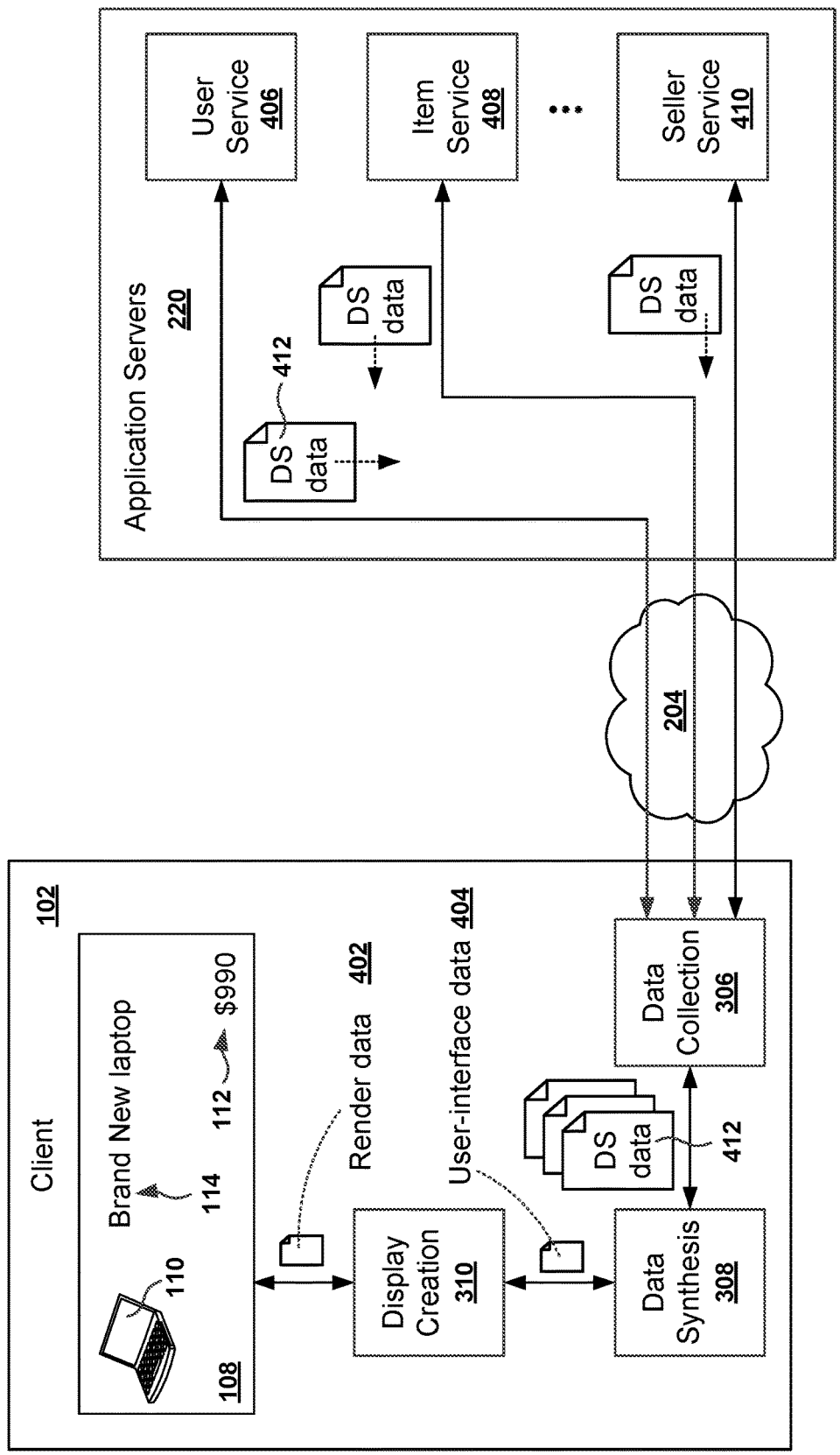
FIG. 4 illustrates the transmission of data for updating the UI on a client device, according to some example embodiments.

FIG. 4 illustrates the transmission of data for updating the UI on a client device, according to some example embodiments. FIG. 4 illustrates how the client device gathers information for presentation of an item for sale 108 on client device 102. The data collection unit requests Domain Service (DS) data 412 from the different domain services. As used herein, a domain service is a computer-implemented utility at the server that provides a service to manage information for an information technology function, and the domain service provides one or more interfaces for adding, modifying, deleting, or reading data associated with the information technology function.

In the example embodiment of FIG. 4, the data collection unit 306 requests DS data from three domain services: user service 406, item service 408, and seller service 410. Each of these services return DS data 412 based on the request submitted by the data collection unit 306.

In one example embodiment, the user service 406 returns DS data 412 associated with the user making the request from client device 102, the item service 408 returns DS data 412 about the item for sale 108, and the seller service 410 returns DS data 412 about the seller of item for sale 108.

Data collection unit 306 transfer the received DS data 412 to data synthesis unit 308, which synthesizes the DS data 412 to select the data for presenting item 108 on the UI, or to generate new data for display based on the DS data received. As used herein, synthesizing data refers to analyzing data and performing operations on the data to generate synthesized data, the operations on the data may include one or more of selecting a piece of data, filtering out part of the data, sorting and organizing the data, combining some data elements to obtain a new piece of data, calculating a new piece of data based on the data, transforming the data (e.g., localizing the data), and formatting the data.

For example, a module may include presenting the seller's name, and the seller domain service has an interface that provides not only the name of the seller, but also other information about the seller, such as rating, address, contact information, geography, etc. Data synthesis unit 308 selects the name of the seller for presentation and discards the rest of the seller information. In another example, data synthesis unit 308 may receive a price and a seller's discount, and obtain the actual price of the item by applying the seller's discount to the price.

Once the data is synthesized by data synthesis unit 308, the data synthesis unit 308 generates user-interface data 404, which is transferred to display creation unit 310. In many cases, the user-interface data 404 has a much smaller size than the combination of all the DS data 412 received from the different services.

The display creation unit 310 processes the user-interface data 404 to generate render data 402, which is used to update the UI, such as by transmitting the rendered data 402 to display interface 304.

If the domain services (e.g., 406, 408, 410) provide interfaces that return a large amount of data, all the data has to be transferred over the network 204, although in many cases, only a small portion of the data is required to update the UI on the client device. For client devices with limited amount of bandwidth or for client devices that have to pay for the bandwidth utilized, this approach results in lower performance and higher cost for the user.

Figure 5:
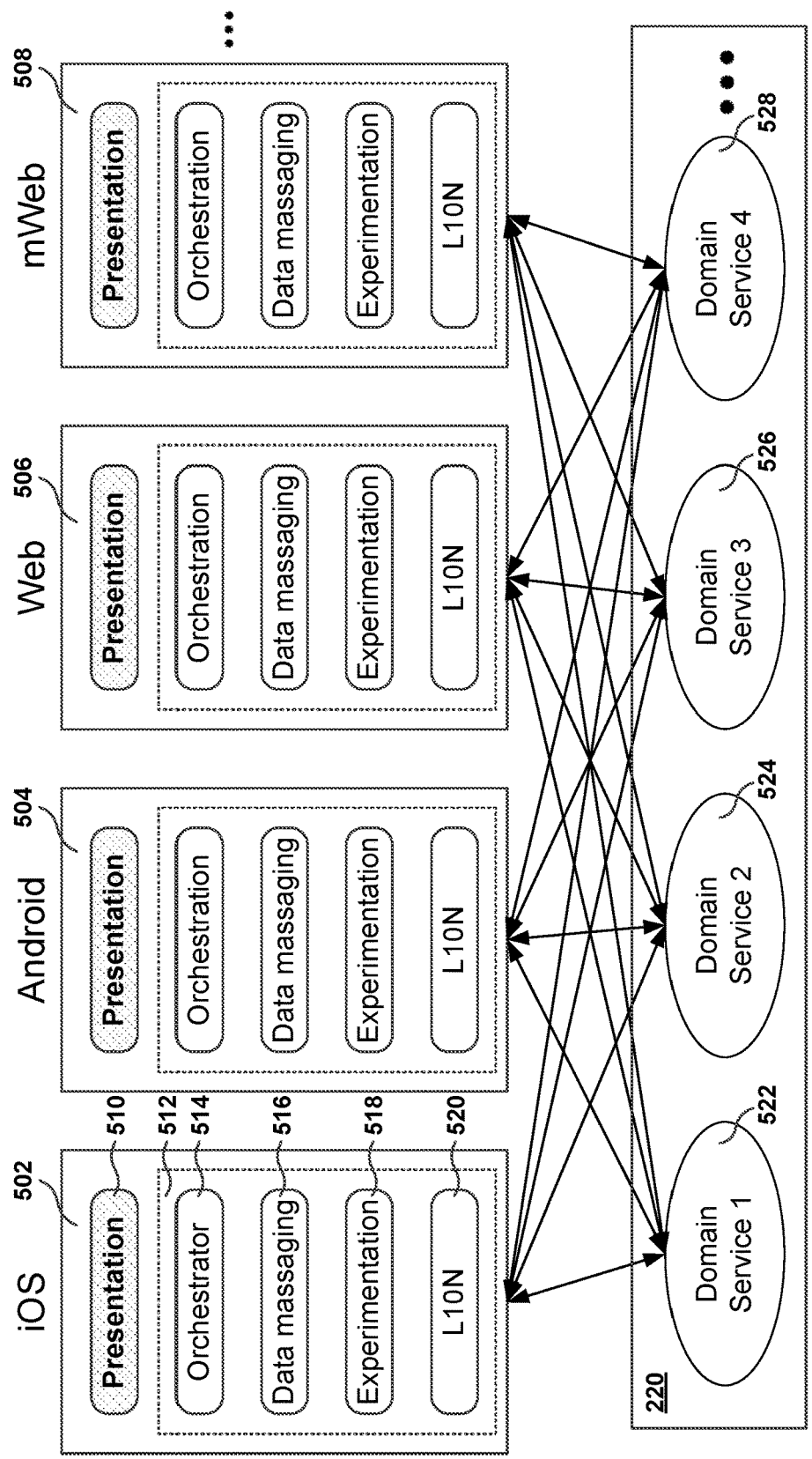
FIG. 5 illustrates the interactions between the client device and the domain services at the server, according to some example embodiments.

FIG. 5 illustrates the interactions between the client device and the domain services at the server, according to some example embodiments. In some implementations, four different types of client environments are supported: iOS™, Android™, Web interface, and mWeb, but the principles presented herein may be used for any type of client environment.

From an architectural perspective, each device includes a presentation layer 510 and a client application layer 512. The client application layer 512 interfaces with application servers 220, which provide support for a plurality of domain services 522, 524, 526, 528, etc., to obtain the data necessary for the UI. The DS data is transferred to the corresponding device for updating the UI.

In some example embodiments, the client application layer 512 can be defined as four different layers: orchestrator 514, data massaging 516, experimentation 518, and localization, also referred to herein as L10N 520. The orchestrator layer 514 is used for "orchestrating" (e.g., coordinating) the gathering of data for the client application. Data massaging layer 516 processes the data collected by the orchestrator 514 in order to generate display-friendly data. The experimentation layer 518 is used for setting experiments regarding client-application features and performance, and for collecting the results of the experiments, which are then forwarded to the application servers 220. Further, the L10N layer is in charge of localizing messages for the local environment associated with the user of client device 502, 504, 506, 508.

In some implementations, the client application needs to perform, at least, the following tasks:
1. Invoke services to retrieve data for the current view;
2. Orchestrate services and splicing of data cross service invocations;
3. Perform error handling and recovery mechanisms;
4. Transform data to convert the data model to a view model;
5. Perform localization;
6. Perform tracking and experimentation functions; and
7. Manage sessions.

All of these tasks have to be duplicated across each of the client platforms. Oftentimes, developing the client application layers 512 requires specialized engineering resources, therefore, there could be one engineering team for each client platform, resulting in duplicative efforts, higher development costs, longer time to market for new features, and having to support specialized talent needs.

This complex development environment creates a long list of problems, including:
too many service calls,
too much data processing at the client,
too much business logic needed at client,
inconsistent implementations between platforms,
need to perform localization at the client,
need to perform transformation operations at the client, (e.g., currency, time conversions), and
need to generate client code to track user behavior.
difficulty in adding new experiments to test feature changes (e.g., what happens if I change the color of the button to green?), because it requires coordination across all client platforms.

Embodiments presented herein alleviate these problems by improving the client-server model and by changing how the server provides data to clients. In some example embodiments, the client application needs to make just one call to one orchestrator at the server to obtain the data required for rendering on the display, without having to sort through large amounts of "noise" data.

It is noted that the example embodiments illustrated in FIG. 5 are examples. Other example embodiments may utilize additional layers, different layers, combine layers, invoke different domain services, etc. The example embodiments illustrated in FIG. 5 should therefore not be interpreted to be exclusive or limiting, but rather as way of example or illustrative.

Figure 6:
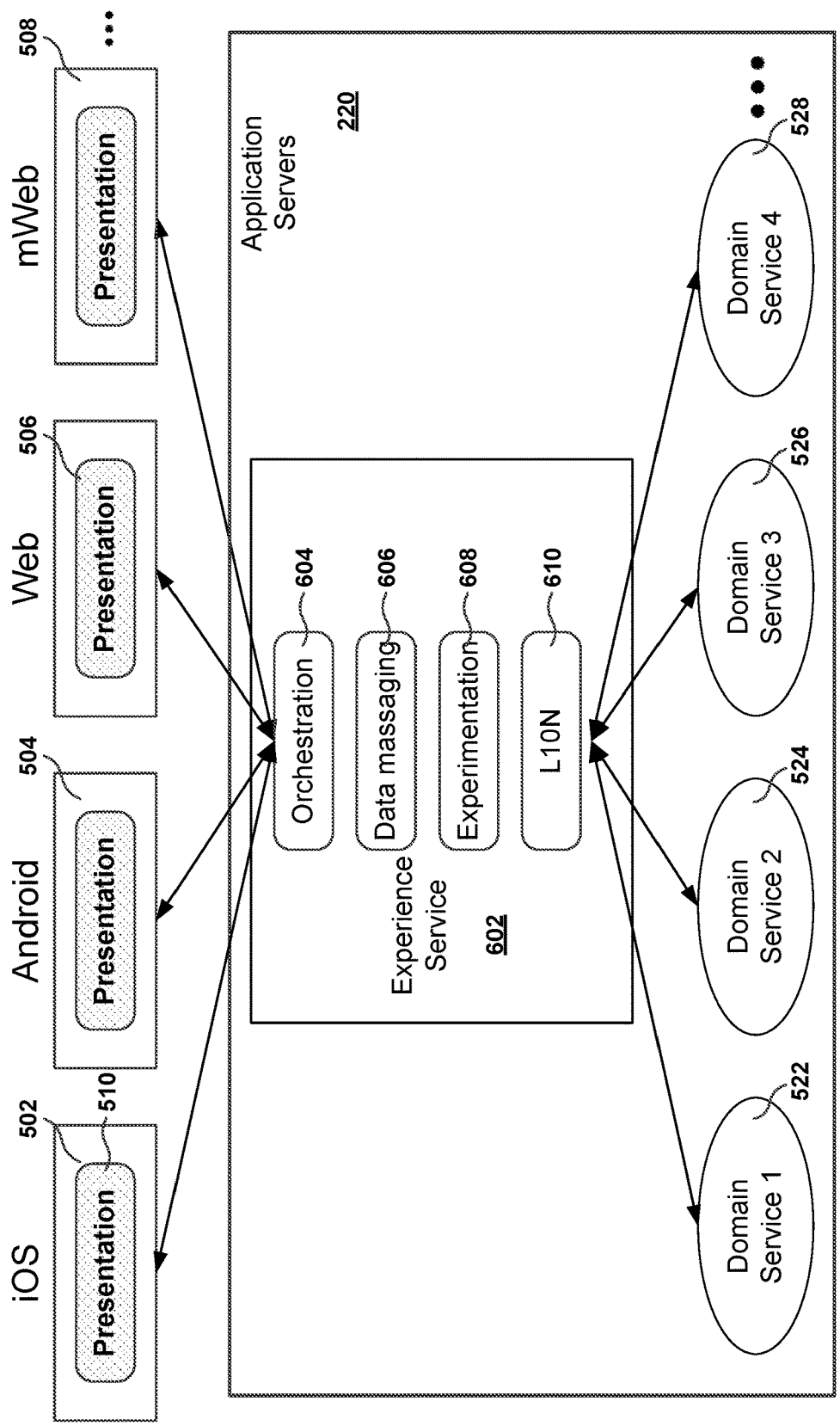
FIG. 6 illustrates an architecture for delivering UI data to a plurality of device types, according to some example embodiments.

FIG. 6 illustrates an architecture for delivering UI data to a plurality of device types, according to some example embodiments. In some example embodiments, the client devices are simplified and include a presentation layer 510, but the client application layer 512 has been virtually eliminated because the functions of the client application layer 512 are performed by application servers 220.

Application servers 220 include an experience service 602 that interacts with the clients and with the domain services 522, 524, 526, and 528. As used herein, experience service is a computer-implemented utility provided by the application servers to deliver a consistent user experience to users accessing one or more services delivered over the network, where the access to the one or more services is supported for a plurality of client-device types and a plurality of client platforms.

Experience service 602 includes four different layers: orchestration 604, data massaging 606, experimentation 608, and L10N 610, which perform, at the application servers 220, similar functionality as described above with reference to the layers implemented at the clients of FIG. 5.

Experience service 602 retrieves DS data from the underlying domain services and processes the DS data to obtain module data, also referred to herein as render-ready data, which may be sent to all the different types of rendering platforms. Experience service 602 translates the DS data from the domain services into the module data required for supporting a uniform service delivery across the multiple platforms.

In some example embodiments, client 102 (e.g., clients 502, 504, 506, 508) makes one call to experience service 602 and receives module data, which has been customized for the client based on the client computer environment. Therefore, it is easy for the client application to receive this customized module data, and perform slight processing before presenting the data on the user interface of the device.

Experience service 602 turns the request from the client 102 into one or more domain service calls and obtain the data necessary to satisfy the request from the client. More detail on how the experience service 602, and the orchestration layer 604 in particular, interacts with the domain services is provided below with reference to FIG. 10. It is noted that, in some example embodiments, experience service 602 is a universal service for all types of clients supported, and experience service 602 is able to deliver UI data for all platforms and for all types of supported requests.

The user interface logic is still at the client device, but the complexity of requesting different types of data and parsing through the data is eliminated, or at least greatly reduced. Further, the logic provided by client application layer 512 does not have to be repeated for all the client platforms. As a result, consistency in service delivery across the different clients is achieved and changes can be made quickly, and virtually simultaneously, for all platforms. For example, if a decision is made to change the color of a user interface button, the change is straightforward and implemented simultaneously in all clients (assuming that the button-color feature is already defined at the client's presentation layer).

This architectural approach also enables rolling out newer business functions to all devices, especially for mobile native apps, requiring fewer updates, or no updates in some cases, to the app. This is possible because experience service 602 manages the business logic and the changes needed to add new functionality, and experience service 602 provides render-ready data to a standardized and reusable UI module. Further, experience service 602 may instruct clients to use different combinations and ordering of pre-built reusable UI modules with different contents to effect new business functionality.

Experience service 602 is designed to provide direct support for the user interface (e.g., client experience) by providing render-ready data for the presentation layer 510.

Further, experience service 602 is designed to provide data for a plurality of different platforms. This approach is different from the traditional approach to developing services that focuses on providing logical data and business rules for accessing and processing the logical data.

The following table summarizes the differences between the new experience services and traditional services:

TABLE 1

| | Experience Services | Traditional Services |
|---|---|---|
| Focus/Intent | For the user interface, produce render-ready data, such as: Item card with embedded information about item and seller Collection card with collection, author, and follower information | Generate generic data and define business rules for accessing the generic data. Not designed for user interface needs (e.g., Item, Seller, Order, Collection, Following) |
| Awareness of client device type | Client-aware Detects device type (e.g., iOS vs Android) Selects modules that work best for the device (e.g., mobile has camera and touch-pay module) | Client unaware Not designed for a particular client Forces client developers to determine how to get and process data |
| Orchestration of service calls | Orchestrates invocations to underlying domain services to obtain data for composing UI | Not available at server, must be done at client |
| Data synthetization | Combines the data returned from the different domain services | Not available at server, must be done at client |
| Data transformation, L10N, etc. | Transforms the data and returns render-ready data for display on all devices consistently | Not available at server, must be done at client |
| User Behavior tracking | Manages user tracking for consistent user behavior tracking across devices | Not available at server, must be done at client |
| Experimentation (A/B testing) | Manage experiments for consistent experimentation across devices | Not available at server, each client decides which data to use |
| User Actionable Error Recovery instruction | Manages error detection and recovery for consistent User Actionable Error Recovery across devices | Not available at server, each client app must support error recovery |

The implementation of experience services greatly reduces time to market for new features, especially if new features can be implemented just by changing the services at the application servers 220. Further, the experience service provides a single point of implementation for much of the experience logic (instead of four times). Further, processing power tends to be much greater at the application servers 220, therefore the overall user experience includes faster service delivery, which is an improvement in the functioning of the client device.

With the experience service approach, client applications are isolated from backend issues, and application developers focus on the interactions with the rendering software at the client. Further, client application developers do not need to learn the intricacies of the domain services and the structure of the domain service data.

Figure 7:
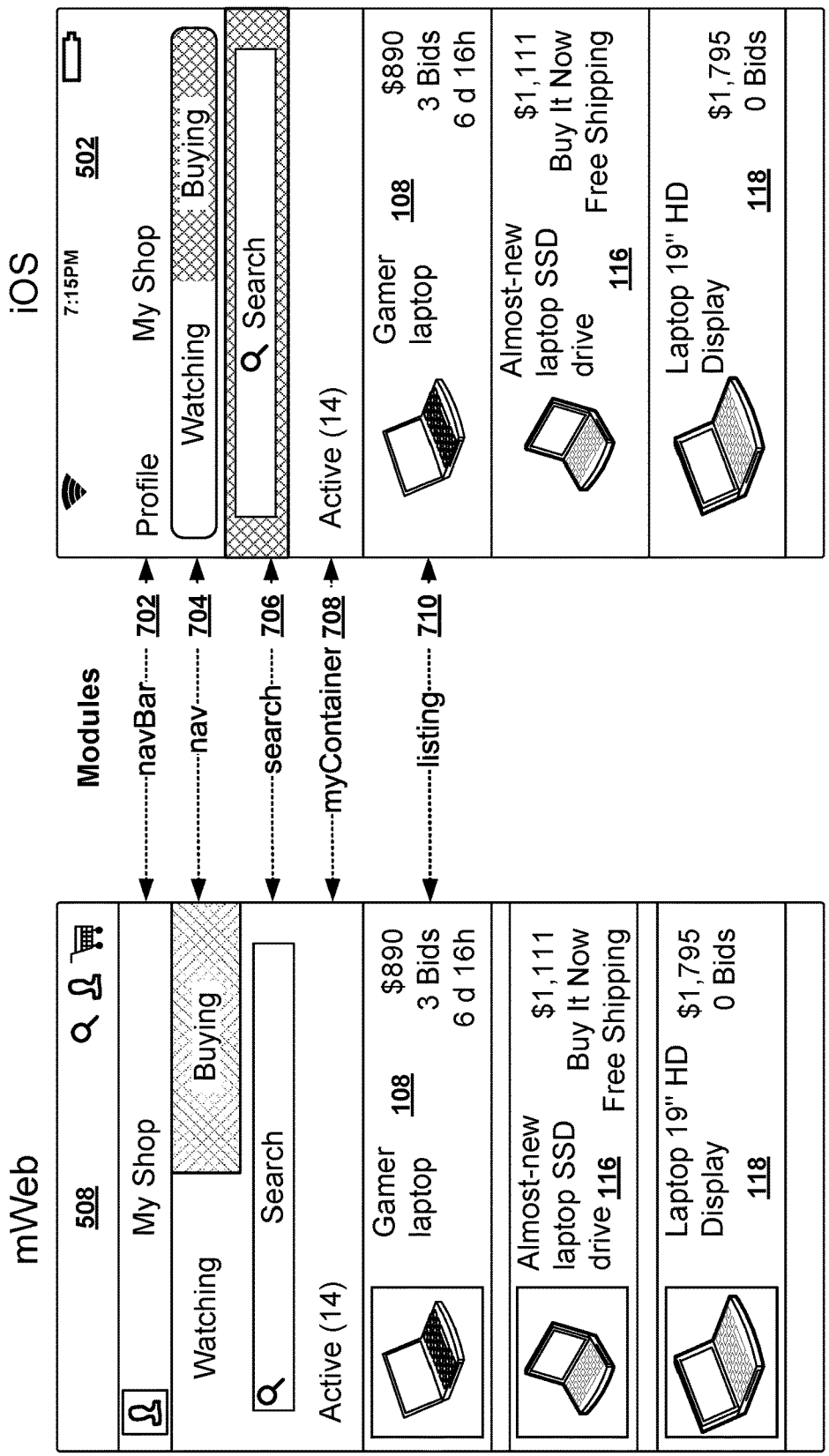
FIG. 7 illustrates the modules of the UI defined for two different client devices, according to some example embodiments.

FIG. 7 illustrates the modules of the UI defined for two different client devices, according to some example embodiments. The user interface is structured as a plurality of display modules (e.g., 702, 704, 706, 708, and 710) and the client application receives the data for each of the display modules from the application servers. The application servers send module data in an easy-to-process format for rendering the corresponding display module at the client.

The navigation bar ("navBar") module 702 generates the navigation bar on the user interface, the navigation module ("nav") 704 displays button options for watching an auction or buying in the electronic commerce site, the search module 706 provides a search interface, the container module 708 ("myContainer") displays a title for the container of items provided below, and the listing display module 710 presents a plurality of items for sale (e.g., 108, 116, 118).

Experience services 602 delivers the data for each of the modules, and can deliver the data simultaneously, or update only the data for one or more modules at a time. In one example embodiment, the module data is defined by a data structure, referred to as module data structure, and the server returns the module data in the format defined by the module data structure. For example, in one implementation the navBar for a mWeb client is defined by a navBar data structure, and the server returns the corresponding data as follows:

```
"navBar": {
    "alias": "nav-bar",
    "heading": "My Shop",
    "subHeading": "Aufpassen",
    "userName": "expsvctest"
    "action": {
        "url": "http://m.ebay.com/seller?sid=es&nav=MYSHOP",
            // mWeb link
        "logo": "profile",
        "label": "Profile"
    }
}
```

The data for navBar includes a title ("My Shop"), a subHeading ("Aufpassen," which is the title in German), information about the user, and an action that includes getting an image from a website (note: the URLs shown in the module data are for presentation purposes only) to present with the label "Profile." Therefore, the amount of data required to be transmitted is the minimal amount for presenting the navBar module.

For an iOS device, the navBar data returned in one example is as follows:

```
"navBar": {
    "alias": "navbar",
    "heading": "My Shop",
    "subHeading": "Aufpassen",
    "userName": "expsvctest"
    "action": {
        "url": "ebay://profile/expsvctest", // app link
        "logo": "profile",
        "label": "Profile"
    }
}
```

The navBar data for iOS is similar to the data for mWEB, except that the image is retrieved from a different address because the images to be displayed are different.

In some example embodiments, a desktop browser is also supported as a client platform. In this case, one example of the navBar data returned for the desktop is as follows:

```
"navBar": {
    "alias": "navbar",
    "heading": "My Shop",
    "subHeading": "Aufpassen", // Localized "Watching" in
        german
    "userName": "expsvctest"
```

-continued

```
    "action": {
        "url": "http://www.ebay.com/seller?sid=es&
            nav=MYSHOP", // classic site link
        "logo": "profile",
        "label": "Profile"
    }
}
```

Again, the data returned is similar but customized for the desktop by the experience service at the application servers. The data returned is enough for updating or adding the navBar module on the user interface, without having to sort through a large amount of unnecessary data at the client. Further, the data is localized by the experience service and ready for rendering.

In some example embodiments, the data structure may also include some Boolean flags, but there is no complex data processing requirements for the client application in order to apply the business logic defined by the domain services. Further, the experience service handles specific aspects of each type of client device to provide customized data. For example, HTTP Uniform Resource Locators (URLs) may be returned for web client's, but native application links may be returned for native applications executing on the client.

Similarly, for the listing module 710, the data returned includes an image URL for the image, a title (a localized string), and price information (e.g., localized price, which may include some formatting such as a different color for a discounted item). This is much less data returned to the client than if the client had to access the different domain services and retrieve all the raw data provided by the domain services.

In some cases, some modules are only applicable to some devices. For example, a mobile phone may have a module accessing the in-built camera (e.g., to take a picture of an item for sale), but the same module will not be added when interfacing with the desktop, because most desktops do not have connected cameras.

With this approach, client applications don't have to sort through large blocks of data. Instead, the client application receives the necessary data for updating the graphical user interface. This is not only simpler, but also provides consistent services across the different device types.

Further, this approach provides an additional benefit because changes can be made to the user interface without having to change the code on the client application. Changing the client application can be a lengthy process, because the client application sometimes has to be validated by the client platform provider, and the user has to do a download with an update for the changes. The flexible approach provided by experience services allows making changes without the user having to update the client application.

Figure 8:
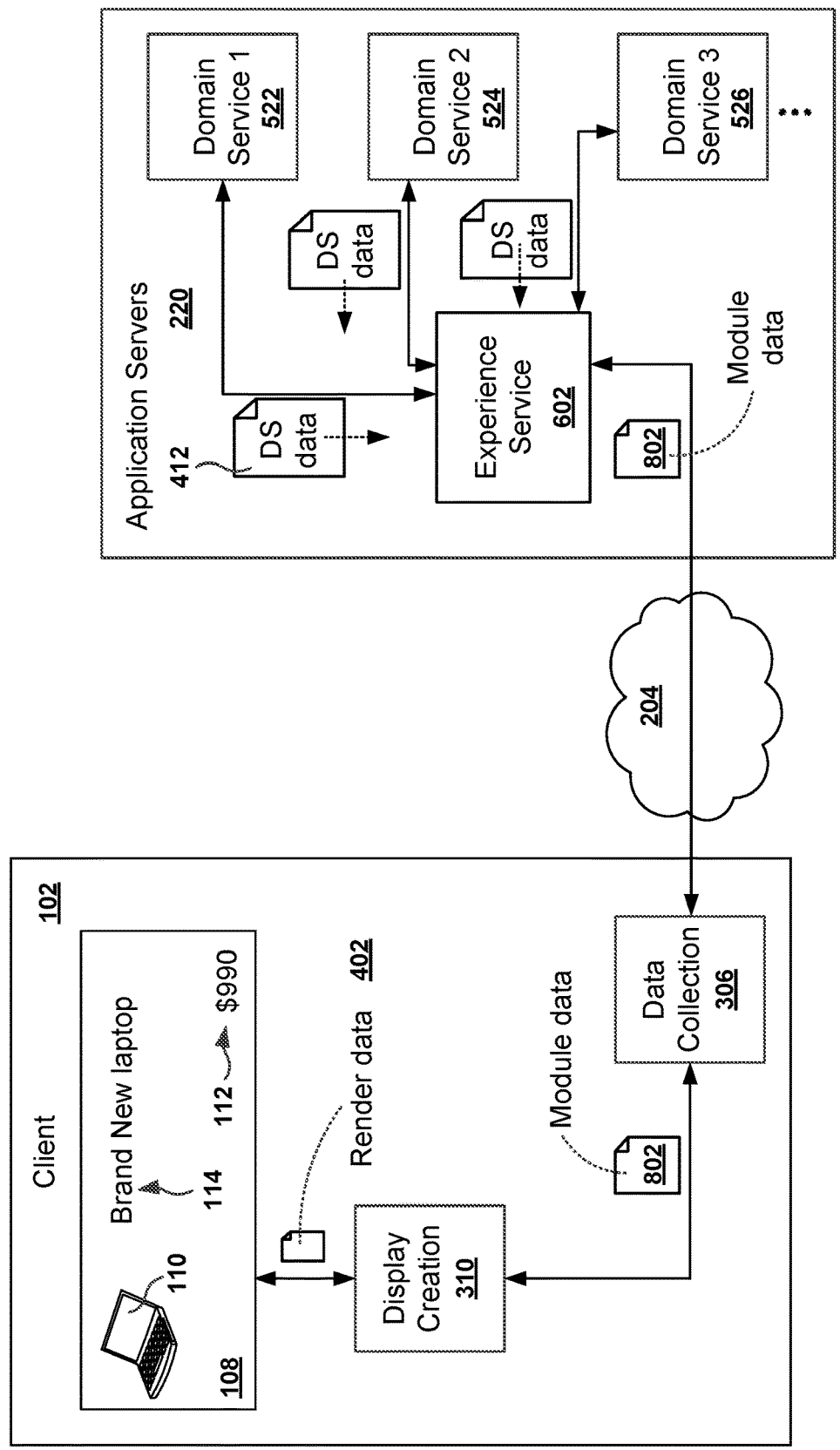
FIG. 8 illustrates the transmission of data for updating the UI while using the experience service, according to some example embodiments.

FIG. 8 illustrates the transmission of data for updating the UI while using the experience service, according to some example embodiments. The application servers 220 include experience service 602, and now the data collection unit 306 places one call to the experience service to update the data on the display (e.g., for module 108 associated with an item for sale).

Client 102 sends a request to application servers 220 to update the UI on the client 102. After receiving the request, experience service 602 determines which module or modules are needed to satisfy the request, and experience service 602 places calls to, for example, three domain services 522, 524, and 526. The domain services return DS data 412 and the experience service 602 synthesizes the data to create module data 802.

Synthesizing the data may include one or more of selecting data from the DS data, filtering out data that is not required for the module data, sorting and organizing the data, combining data from two or more pieces of DS data to obtain a new piece of data for the module data, calculating a new piece of data based on the DS data (e.g., calculating a discounted price based on a current price and an applicable sales discount percentage), transforming the data (e.g., localizing the data), and formatting the data according to the definition of the module data structure.

Once the experience service 602 creates the module data, the module data 802 is transmitted to the client 102, where the data collection unit 306 transfer the data to display creation unit 310. Rendered data 402 is then produced based on the module data.

Therefore, the complexity of rendering data at the client 102 has been greatly reduced because the client does not have to access a plurality of domain services and sort through all the DS data. Of course, the complexity of the application service has been increased by the experience service 602, but it is much easier to make changes to the display data at a centralized location (the servers) than having to deal with a plurality of different client types and client platforms.

Figure 9:
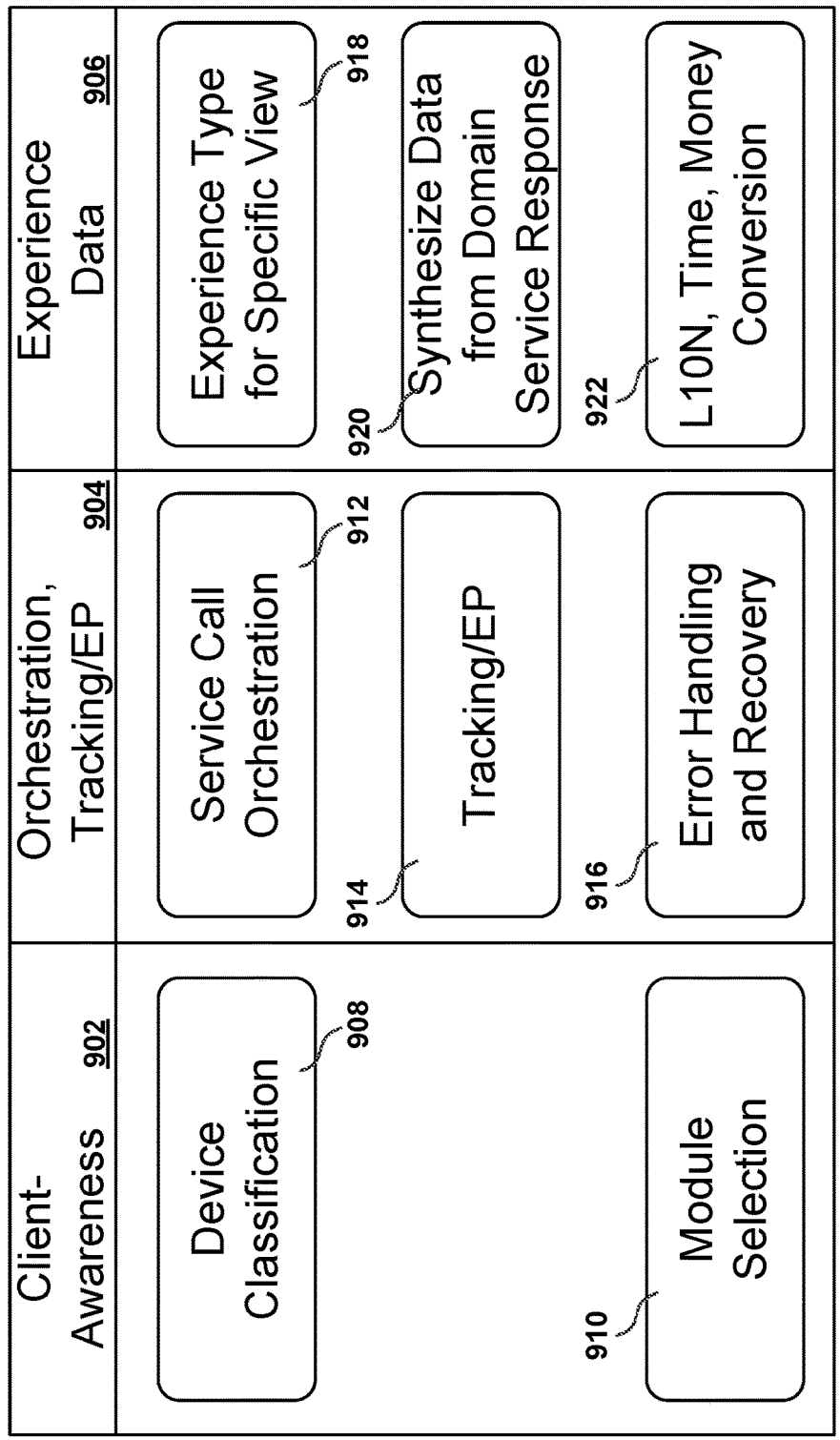
FIG. 9 illustrates the functional areas for the experience service, according to one example embodiment.

FIG. 9 illustrates the functional areas for the experience service, according to one example embodiment. At high level, experience services has 3 major functional areas: client awareness 902; orchestration, tracking, and experimentation 904; and experienced data 906.

Client awareness 902 includes device classification 908 and module selection 910. Device classification 908 determines what type of client is sending a request, such as determining if the client is a mobile phone, a desktop, a tablet, a device with a small screen (e.g., 7 inches or less), a device with a large screen (e.g., more than 7 inches), the operating system of the device, the version of the operating system, the version of the client application, etc.

Device classification 908 keeps tracks of the different versions for the same client device type, and provides functionality for the different versions. Client applications usually grow in capability with the release of each version. For example, version 1 may have 10 modules; version 2 may introduce 5 more new modules and modify a couple of old modules from version 1. Experience service needs this version-to-capability information to support best user experience for clients on different versions concurrently.

By encapsulating the orchestration of domain service invocations and providing presentation defined as render-ready, client applications can be sheltered from the versioning changes of domain services if the changes have no apparent observable impact on the user experience. Also, because a domain service is focused on one core entity and is free of churns with every UI change, a more stable core entity and business rules cause fewer changes to domain services, resulting in fewer versioning changes on the domain service side.

The device type is also important for determining specific data and transformation requirements. In some devices, space on the screen is limited, and these devices may require to shorten the length of the text/time/money string while conveying the same information. Further, action Uniform Resource Identifier (URI) is another important type of device specific data. For example, in the response for browser-based web applications, the URI will typically be a HTTP URL in the response for a mobile native app, but the URI may be an App link on custom applications.

Module selection 910 determines which modules are invoked when a request is received from a client. More details are provided below with reference to FIG. 9.

The orchestration, tracking/EP function 904 includes service call orchestration 912, tracking/EP 914, and error handling and recovery 916. Service call orchestration 912 is performed by an orchestrator in the application server, and more details are provided below with reference to FIG. 10.

Tracking/EP 914 relates to tracking user activity and performing experiments to determine the usefulness of new features. Experience Service can manage most of impression tracking since experience service knows what is being displayed to user, especially with the advancement of COS Tracking 2.0 standard.

Error handling and recovery 916 is invoked when an error is encountered. In a complex service-oriented architecture, service failure is to be expected, at least to a certain degree. When the client applications have to devise their own inconsistent ways to deal with errors (ranging from a resilient alternative solution all the way down to a blank page/view, or even worse a HTTP 500 error code in some cases) user experience suffers. Experience service centralizes the handling of backend service failures and provides a frontline error handling approach to deliver a better error-handling experience across all devices and client applications. For example in some cases, cached data can be served by the application servers to enable business continuity.

The experience data function 906 includes experience types for a specific view 918, synthesize data from domain service responses 920, and L10N, time and money conversion 922. The experience type for a specific view 918 manages the user experience across views and across multiple devices to deliver a consistent service across all devices.

Synthesize data from domain service responses 920 manages the processing of data delivered by the different domain services, as discussed in more detail below with reference to FIG. 10.

L10N, time and money conversion 922 provides localization services. Experience Services is an important tool that allows quick deployment in multiple regions almost simultaneously. Further, duplicated L10N effort across stacks is a difficult problem when a plurality of teams have to develop a unique approach towards localization. For example, experience service is able to provide localized text based on the viewer's language preference, regardless of which marketplace the user is in. The textual content to be localized include dynamic text from end user (e.g. item title & description), structured data from catalog systems (e.g. category name, production name), and static label needed in each view/UI component. Also centralizing conversion of time and money across all stacks can relief client applications across multiple platforms from having to duplicate efforts.

FIG. 10 is an example module selection table, according to some example embodiments. The module selection table 1002 is used by the experience service to determine which modules are associated with a received request. In one example embodiment, module selection table 1002 includes a plurality of fields (corresponding to the columns of the table), where one of the fields is the modules field, which includes a list of one or more of modules (e.g., $M_1$, $M_2$, $M_3$).

Other fields of the table include: the view associated with the request which identifies a particular screen of the UI (e.g., My Shop view for shopping, or "Following" view for following an item in an auction); the marketplace associated with the user (e.g., United States, Germany, or "All" for all market places); a user segment which identifies one or more segments defined by the application (e.g., all users, top 10% of buyers, new user, etc.); EP for experimentation, used for testing of user features; and Device/App for defining the device type and the application type.

Module selection table 1002 includes a plurality of entries (corresponding to the rows of the table) which are used for selecting the modules. When the request comes in, the module selection table is checked to identify the entry associated with the request. The check for the entry may be performed in one or more of the table fields. For example, in some example embodiments all the fields, except for the modules field, are checked to determine which entry is associated with the incoming requests. In other example embodiments, a subset of the fields is checked to determine the entry, such as by looking at the View field and the Device/App field. It is noted that some entries in the table fields may include wildcards or be empty, which signifies a wildcard.

For example, the device detection service may first determine the type of client device (including the operating system), and the application executing on the client device. In one example embodiment, device detection includes determining if the device has a small screen (up to 7") or a large screen (more than 7").

Experience service then determines the marketplace (e.g., Canada, US, France) that the user is in, the user segment, whether the device is in experiment (EP) mode or not, and then determine the modules required as identified in the modules field of the entry associated with the incoming request.

In addition to the type of device and application, the additional factors used for selecting different modules helps to provide a better user experience, such as using the marketplace (e.g., US versus Germany versus India) to focus on providing a local experience. Further, differentiating by user segment can provide features corresponding to the different shopping behaviors. Also, when dealing with experiments, it is possible to present temporarily certain modules to compare responses from the users and determine the benefit of using these modules.

After an entry is selected, the modules listed in the corresponding field are identified, and the experience service has to obtain the module data for the identified modules. For example, if the first entry of the table is selected, modules $M_1$, $M_2$, and $M_3$ are identified, and the experience service must gather the data from the domain services to update the data for these modules.

Some modules may be device-independent and can be used for several types of devices. On the other hand, some of the modules may be device specific.

Further, in some implementations, a single module selection table is defined by the experience service, but in other implementations the module selection table is distributed across a plurality of module selection tables. For example, different functional units may manage their own module selection table, and the experience service examines all the available module selection tables to determine how to process incoming requests. For example, in some implementations 10-20 different module selection tables are defined, where each table may have up 100 entries, but a different number of tables may also be utilized with a different number of entries.

It is noted that the example embodiments illustrated in FIG. 10 are examples. Other example embodiments may utilize different fields, fewer fields, or combine two or more fields. The example embodiments illustrated in FIG. 10 should therefore not be interpreted to be exclusive or limiting, but rather by way of example or illustrative.

FIG. 11 is a table illustrating the domain-service selection logic based on the module, according to some example embodiments. Once the modules are selected, the experience service determines which domain services must be invoked to obtain the data for the modules.

Domain service selection logic 1102 provides the logic for determining which domain service to invoke, and in some cases, in which the order. FIG. 11 illustrates the use of a table for determining the domain service selection, but other types of logic may also be utilized, such as embedded code, a database, a list, etc. In the example of FIG. 11, for each module (e.g., row) a plurality of domain service fields are identified, one field for each domain service (one domain service per column). In the corresponding entry of the table, a priority code identifies the order in which domain services are invoked. For example, all the domain services may be involved in parallel at the same time, then their priority body would be 1 for all the identified domain services. If a priority is equal to 2, then the domain services with priority 1 are first invoked, and when the data for those domain services is returned, then domain services with priority 2 are invoked. In some example embodiments, the priority is used for determining the transmittal of modules to the client so the client can start presenting modules before all the data is received.

For example, domain service 3 may require input data which is obtained by a combination of data provided by domain services 2 and 4. This means that the experience service would invoke domain services 2 and 4 first, and then invoke domain service 3. Once all the DS data is available, the experience service selects the data required for the module data to be sent to the client.

Figure 12:
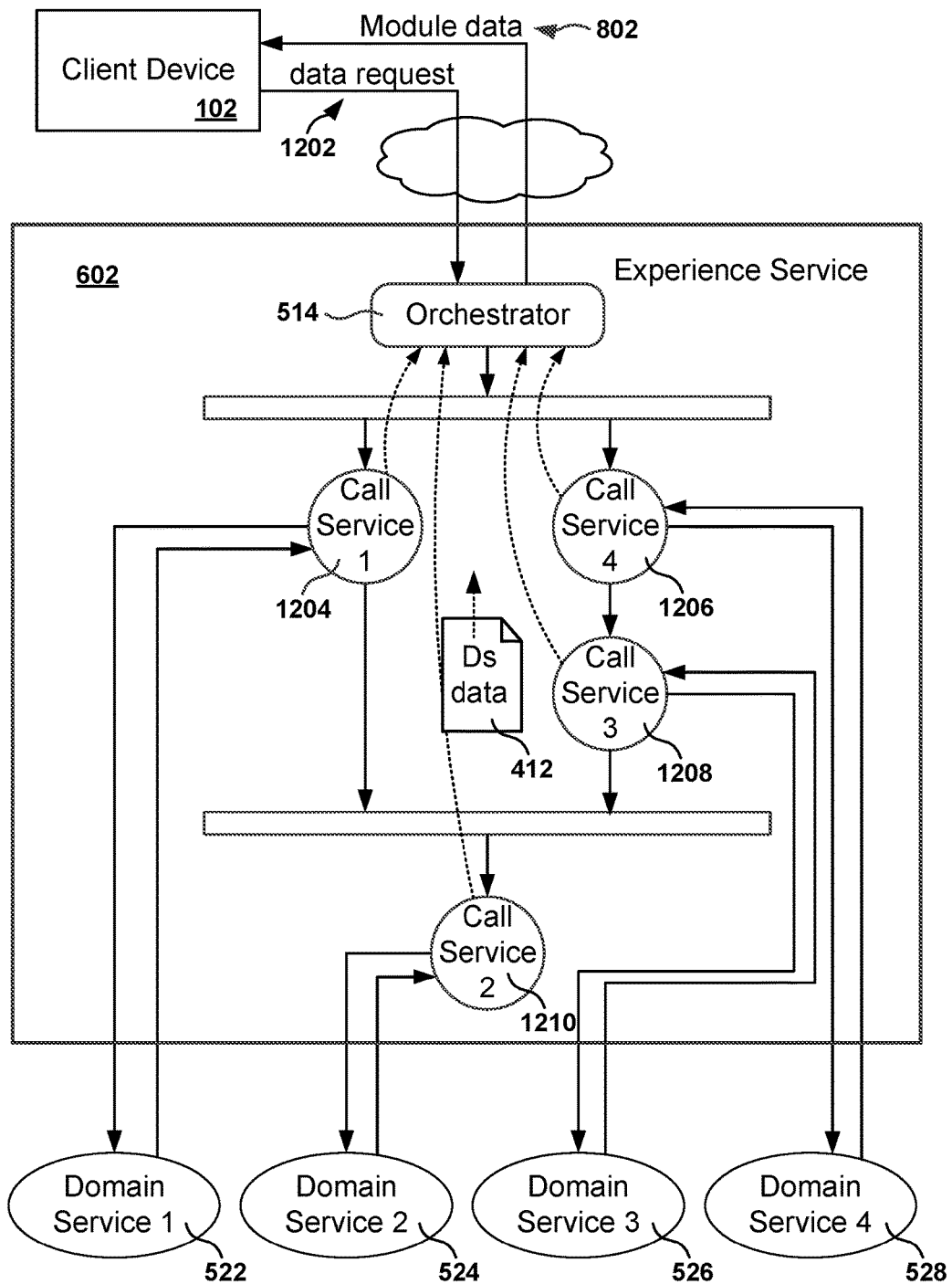
FIG. 12 illustrates the interactions between the orchestrator and the domain services, according to some example embodiments.

FIG. 12 illustrates the interactions between the orchestrator and the domain services, according to some example embodiments. In one example embodiment, the client device 102 sends a data request 1202 to experience service 602. Orchestrator 514 determines which modules are required, and from those modules which domain services must be invoked. As noted above, the calls to the domain services may be performed in parallel, or serially, or in a combination of parallel and serial. Each of the domain services return DS data 412 (some omitted from the Figure for clarity) for orchestrator 514.

In the example embodiment of FIG. 12, the orchestrator has determined that domain services 1-4 will be invoked, and that domain services 1 and 4 can be involved in parallel. Further, domain service 3 is to be invoked after domain service 4 finishes, and domain service 2 is to be invoked after domain services 1-3 have finished.

Therefore, the orchestrator 514 initiates in parallel calls 1204 to domain service 1 522 and 1206 to domain service 4 528. After domain service 4 returns the corresponding DS data, orchestrator 514 initiates call 1208 to domain service 3 526. Further, when domain service 1 522 and domain service 3 526 complete, then orchestrator 514 places a call 1210 to domain service 2 524.

After orchestrator 514 receives the DS data, the data is synthesized in the corresponding module data 802 and transmitted to client device 102. In addition, orchestrator 514 may start synthesizing the DS data as the DS data becomes available without having to wait for all the DS data to be received. Therefore, progressive rendering is available, so the orchestrator 514 does not have to receive all the DS data before starting to send module data 802 to the client device. For example, if module 1 only needs data from domain service 1 522, then the orchestrator can send the data for module one right after call service 1204 completes. This way, the user may start interacting with the data without having to wait for the complete screen to be available.

Further, orchestrator 514 controls how the display data is sent back to the client device, defining the order in which module data is sent back for updating the UI in order to improve user experience.

Experience service 602 provides practical benefits for improving the speed of data delivery and the user experience, in addition to engineering benefits, especially for mobile devices. There is a reduced number of roundtrip service calls, which is beneficial when the client is utilizing a slow wireless network. Now, the communications with the domain services are invoked locally on the service provider environment, which usually have fast connections and high available network bandwidth. Further, by reducing the amount of data transmitted to the client, the user may save money if the user is paying per byte transmitted, and the user does not have to pay for data that the user does not need.

Figure 13:
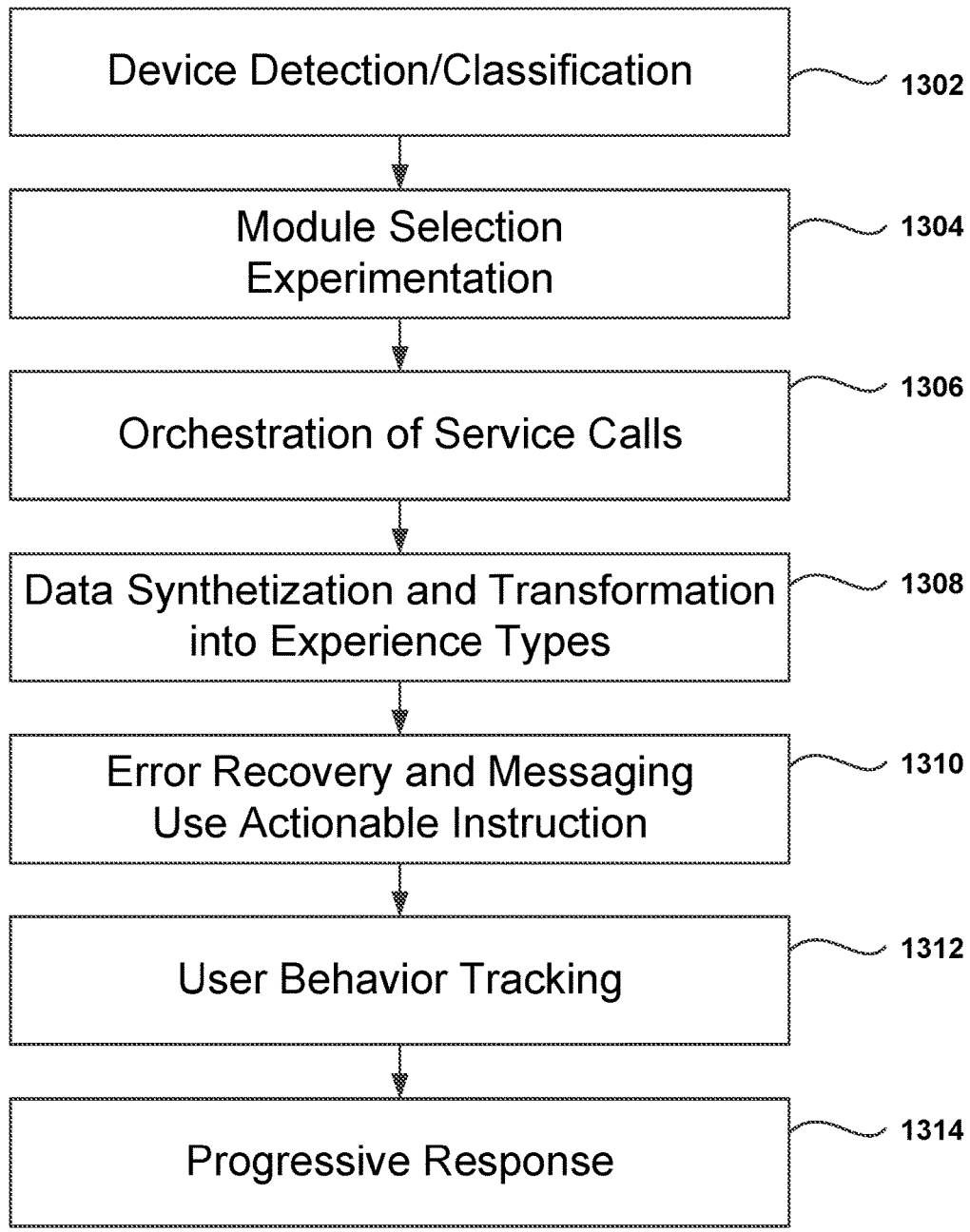
FIG. 13 is a flowchart of a method for experience service request processing, according to one example embodiment.

FIG. 13 is a flowchart of a method for experience service request processing, according to one example embodiment. In operation 1302, the method detects the device type and application type. From operation 1302, the method flows to operation 1304 where module selection (as discussed above with reference to FIG. 10) and experimentation are identified for the received request.

In operation 1306, the service calls to the domain services are orchestrated, as illustrated above with reference to FIG. 12. Once the data is returned from the domain services, data synchronization and transformation into experience types takes place in operation 1308. In this operation, the module data is built.

In operation 1310, error recovery and messaging takes place, and if an error occurs, error handling procedures are deployed. In some cases, user behavior tracking 1312 is invoked to analyze user response under different circumstances and different features provided to the user.

Further, in operation 1314, a progressive response is provided to the user by transmitting module data as the data becomes available, instead of having to create data for the complete UI.

Figure 14:
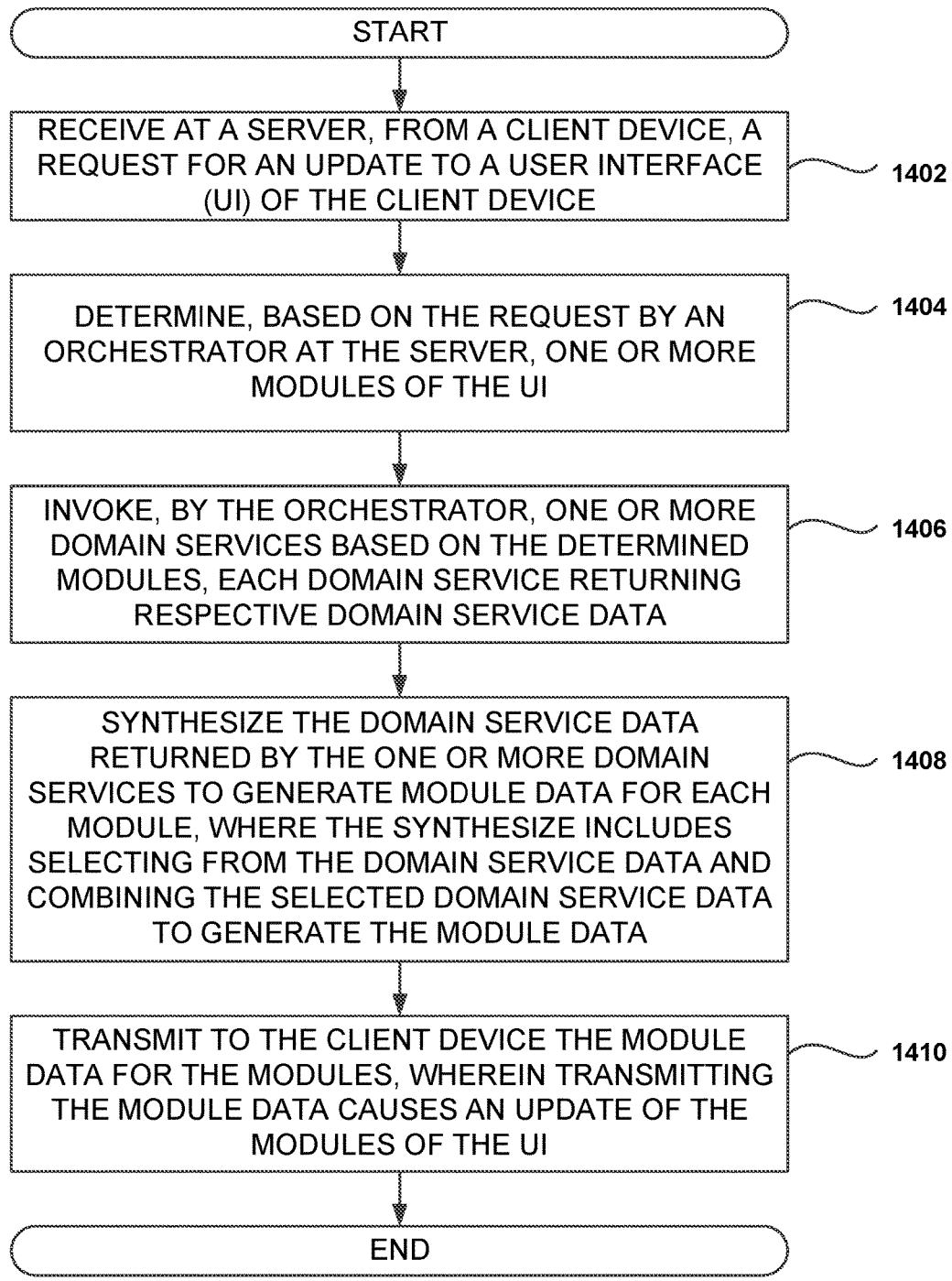
FIG. 14 is a flowchart of a method for optimizing data transmission for a user interface to deliver a consistent multi-platform experience service, according to some example embodiments.

FIG. 14 is a flowchart of a method for optimizing data transmission for a user interface to deliver a consistent multi-platform experience service, according to some example embodiments. While the various operations in this flowchart are presented and described sequentially, one of ordinary skill will appreciate that some or all of the operations may be executed in a different order, be combined or omitted, or be executed in parallel.

In operation 1402, a request is received at a server from a client device, the request being for an update to a user interface (UI) of the client device (see for example data request 1202 in FIG. 12). From operation 1402, the method flows to operation 1404 for determining, based on the request by an orchestrator at the server, one or more modules of the UI. In some example embodiments, the module selection table FIG. 10 is utilized for determining the modules.

From operation 1404, the method flows to operation 1406 for invoking, by the orchestrator, one or more domain services based on the determined modules, each domain service returning respective domain service data (see for example DS data 412 in FIG. 8).

From operation 1406, the method flows to operation 1408 for synthesizing the domain service data returned by the one or more domain services to generate module data for each module. The synthesizing includes selecting from the domain service data and combining the selected domain service data to generate the module data.

Further, from operation 1408, the method flows to operation 1410 where the module data for the modules is transmitted to the client device, wherein transmitting the module data causes an update of the modules of the UI.

In some implementations, the determining of the one or more modules associated with the request further includes selecting an entry in a module selection table based on the request (where the module selection table includes a plurality of fields that include a marketplace field, a device type field, and a modules field) and selecting the modules identified in the modules field of the selected entry.

In some implementations, the plurality of fields in the module selection table further include a view field, a user-segment field, and an experimentation field. In some example embodiments, the method further includes detecting an error returned by one of the domain services, and performing error recovery at the server based on the detected error.

In some implementations, the determining of the one or more modules 1404 further includes detecting a device type and a device-operating-system type based on the request, where the entry of the module selection table is selected based on the detected device type and device-operating-system type.

In some example embodiments, the domain services include one or more of a user-information service, a marketplace service, a seller information service, a search service, and a messaging service.

In some implementations, synthesizing the domain service data further includes identifying data from the domain service data needed for generating the module data, and extracting the identified data, where domain service data unnecessary for generating the module data is not transmitted to the client device.

In some example embodiments, a first module is presentable on two or more client device types, where synthesizing the domain service data includes creating module data for the first module based on the client device type.

In some example embodiments, a second module presents on the UI of the client device an item for sale, where the module data for the second module includes an image of the item for sale, a price, and a description of the item for sale.

In some implementations, the server further includes an experimentation component, and the method further includes sending, from the experimentation component at the server to the client device, experimentation data identifying an experiment for the client device, wherein the experimentation data is transmitted to the client device to test a service feature.

Figure 15:
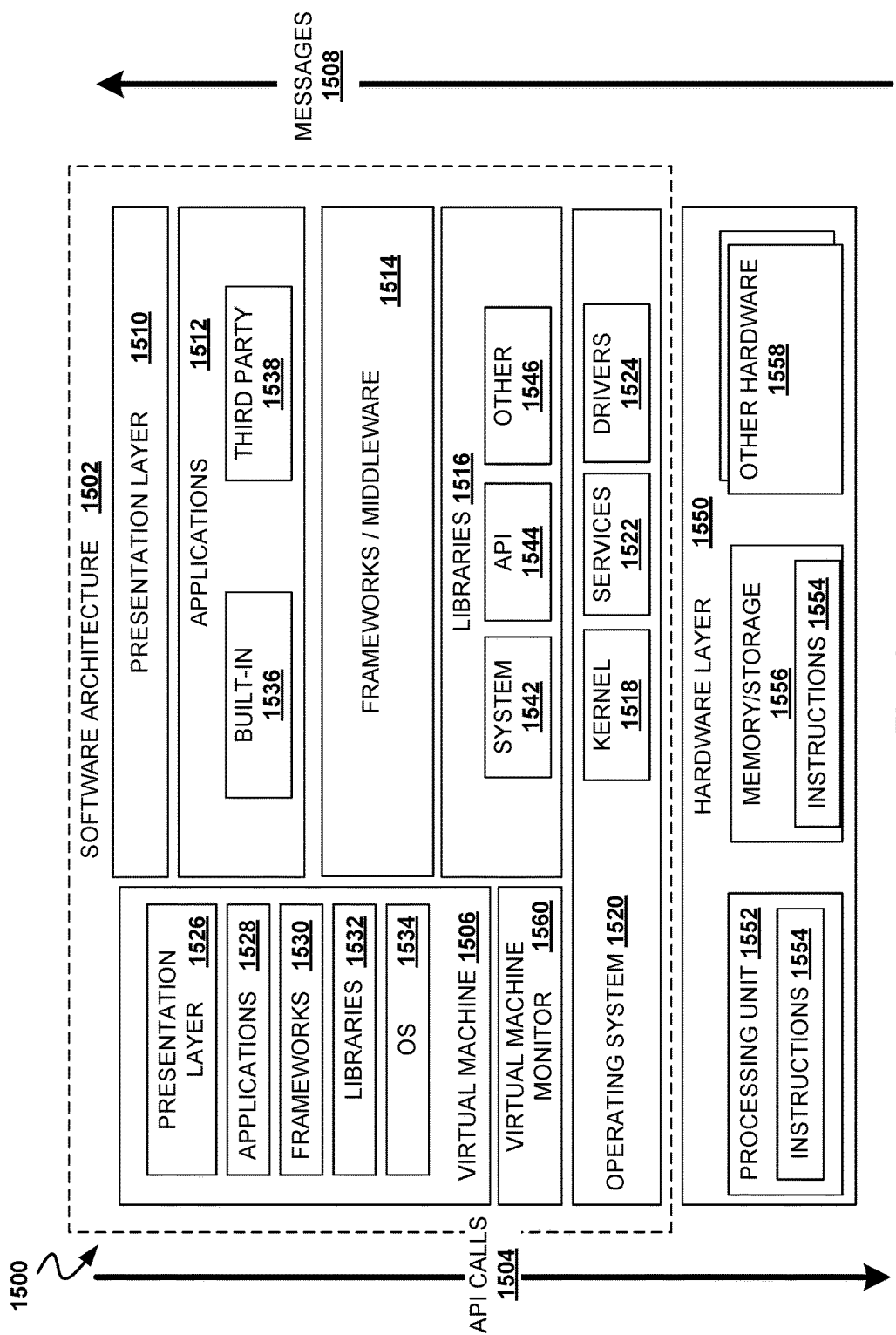
FIG. 15 is a block diagram illustrating a representative software architecture, which may be used in conjunction with various hardware architectures herein described.

FIG. 15 is a block diagram 1500 illustrating an example software architecture 1502, which may be used in conjunction with various hardware architectures herein described. FIG. 15 is a non-limiting example of a software architecture 1502, and it will be appreciated that many other architectures may be implemented to facilitate the functionality described herein. The software architecture 1502 may execute on hardware such as machine 1600 of FIG. 16 that includes, among other things, processors 1604, memory 1614, and input/output (I/O) components 1618. A representative hardware layer 1550 is illustrated and can represent, for example, the machine 1600 of FIG. 16. The representative hardware layer 1550 includes a processing unit 1552 having associated executable instructions 1554. Executable instructions 1554 represent the executable instructions of the software architecture 1502, including implementation of the methods, components and so forth described herein. The hardware layer 1550 also includes memory and/or storage components memory/storage 1556, which also have executable instructions 1554. The hardware layer 1550 may also comprise other hardware 1558.

In the example architecture of FIG. 15, the software architecture 1502 may be conceptualized as a stack of layers where each layer provides particular functionality. For example, the software architecture 1502 may include layers such as an operating system 1520, libraries 1516, frameworks/middleware 1514, applications 1512 and presentation layer 1510. Operationally, the applications 1512 and/or other components within the layers may invoke application programming interface (API) calls 1504 through the software stack and receive messages 1508 in response to the API calls 1504. The layers illustrated are representative in nature and not all software architectures have all layers. For example, some mobile or special purpose operating systems may not provide a frameworks/middleware 1514, while others may provide such a layer. Other software architectures may include additional or different layers.

The operating system 1520 may manage hardware resources and provide common services. The operating system 1520 may include, for example, a kernel 1518, services 1522, and drivers 1524. The kernel 1518 may act as an abstraction layer between the hardware and the other software layers. For example, the kernel 1518 may be responsible for memory management, processor management (e.g., scheduling), component management, networking, security settings, and so on. The services 1522 may provide other common services for the other software layers. The drivers 1524 may be responsible for controlling or interfacing with the underlying hardware. For instance, the drivers 1524 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be used by the applications 1512 and/or other components and/or layers. The libraries 1516 typically provide functionality that allows other software components to perform tasks in an easier fashion than to interface directly with the underlying operating system 1520 functionality (e.g., kernel 1518, services 1522 and/or drivers 1524). The libraries 1516 may include system libraries 1542 (e.g., C standard library) that may provide functions such as memory allocation functions, string manipulation functions, mathematic functions, and the like. In addition, the libraries 1516 may include API libraries 1544 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1546 to provide many other APIs to the applications 1512 and other software components.

The frameworks/middleware 1514 (also sometimes referred to as middleware) provide a higher-level common infrastructure that may be used by the applications 1512 and/or other software components. For example, the frameworks/middleware 1514 may provide various user interface (UI) functions, high-level resource management, high-level location services, and so forth. The frameworks/middleware 1514 may provide a broad spectrum of other APIs that may be utilized by the applications 1512 and/or other software components, some of which may be specific to a particular operating system or platform.

The applications 1512 include built-in applications 1536 and/or third-party applications 1538. Examples of representative built-in applications 1536 may include, but are not limited to, a contacts application, a browser application, a book reader application, a location application, a media application, a messaging application, and/or a game application. Third-party applications 1538 may include an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1538 may invoke the API calls 1504 provided by the mobile operating system such as operating system 1520 to facilitate functionality described herein.

The applications 1512 may use built-in operating system functions (e.g., kernel 1518, services 1522 and/or drivers 1524), libraries 1516, frameworks/middleware 1514 to create user interfaces to interact with users of the system. Alternatively, or additionally, in some systems interactions with a user may occur through a presentation layer, such as presentation layer 1510. In these systems, the application/component "logic" can be separated from the aspects of the application/component that interact with a user.

Some software architectures use virtual machines. In the example of FIG. 15, this is illustrated by a virtual machine 1506. The virtual machine 1506 creates a software environment where applications/components can execute as if they were executing on a hardware machine (such as the machine 1600 of FIG. 16, for example). The virtual machine 1506 is hosted by a host operating system (e.g., operating system (OS) 1534) and typically, although not always, has a virtual machine monitor 1560, which manages the operation of the virtual machine 1506 as well as the interface with the host operating system (i.e., operating system 1520). A software architecture executes within the virtual machine 1506 such as an operating system (OS) 1534, libraries 1532, frameworks 1530, applications 1528 and/or presentation layer 1526. These layers of software architecture executing within the virtual machine 1506 can be the same as corresponding layers previously described or may be different.

Figure 16:
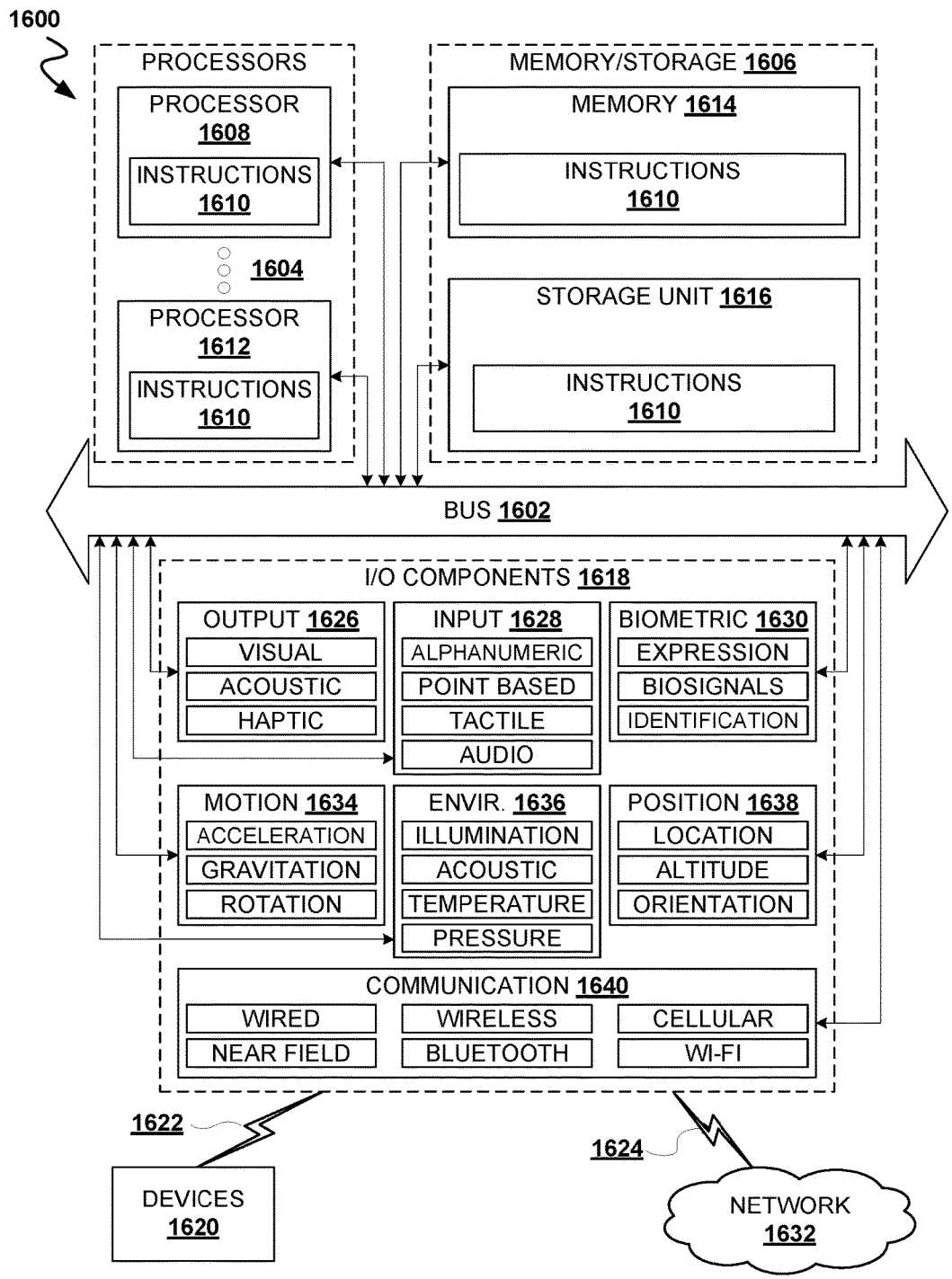
FIG. 16 is a block diagram illustrating components of a machine, according to some example embodiments, able to read instructions from a machine-readable medium (e.g., a machine-readable storage medium) and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1610 (e.g., software, a program, an application, an applet, an app, or other executable code) for causing the machine 1600 to perform any one or more of the methodologies discussed herein may be executed. As such, the instructions 1610 may be used to implement components described herein. The instructions 1610 transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1610, sequentially or otherwise, that specify actions to be taken by machine 1600. Further, while only a single machine 1600 is illustrated, the term "machine" shall also be taken to include a collection of machines that individually or jointly execute the instructions 1610 to perform any one or more of the methodologies discussed herein.

The machine 1600 may include processors 1604, memory memory/storage 1606, and input/output (I/O) components 1618, which may be configured to communicate with each other such as via a bus 1602. In an example embodiment, the processors 1604 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1608 and processor 1612 that may execute instructions 1610. The term "processor" is intended to include multi-core processor that may comprise two or more independent processors (sometimes referred to as "cores") that may execute instructions 1610 contemporaneously. Although FIG. 16 shows multiple processors 1604, the machine 1600 may include a single processor with a single core, a single processor with multiple cores (e.g., a multi-core process), multiple processors with a single core, multiple processors with multiples cores, or any combination thereof.

The memory/storage 1606 may include a memory 1614, such as a main memory, or other memory storage, and a storage unit 1616, both accessible to the processors 1604 such as via the bus 1602. The storage unit 1616 and memory 1614 store the instructions 1610 embodying any one or more of the methodologies or functions described herein. The instructions 1610 may also reside, completely or partially, within the memory 1614, within the storage unit 1616, within at least one of the processors 1604 (e.g., within the processor's cache memory), or any suitable combination thereof, during execution thereof by the machine 1600. Accordingly, the memory 1614, the storage unit 1616, and the memory of processors 1604 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1610. The term "machine-readable medium" shall also be taken to include any medium, or combination of multiple media, that is capable of storing instructions (e.g., instructions 1610) for execution by a machine (e.g., machine 1600), such that the instructions, when executed by one or more processors of the machine 1600 (e.g., processors 1604), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1618 may include a wide variety of components to receive input, provide output, produce output, transmit information, exchange information, capture measurements, and so on. The specific input/output (I/O) components 1618 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1618 may include many other components that are not shown in FIG. 16. The input/output (I/O) components 1618 are grouped according to functionality merely for simplifying the following discussion and the grouping is in no way limiting. In various example embodiments, the input/output (I/O) components 1618 may include output components output components 1626 and input components 1628. The output components 1626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1618 may include biometric components 1630, motion components 1634, environmental environment components 1636, or position components 1638 among a wide array of other components. For example, the biometric components 1630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1634 may include acceleration sensor components (e.g., accelerometer), gravitation sensor components, rotation sensor components (e.g., gyroscope), and so forth. The environmental environment components 1636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1618 may include communication components 1640 operable to couple the machine 1600 to a network 1632 or devices 1620 via coupling 1624 and coupling 1622, respectively. For example, the communication components 1640 may include a network interface component or other suitable device to interface with the network 1632. In further examples, communication components 1640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1620 may be another machine or any of a wide variety of peripheral devices (e.g., a peripheral device coupled via a Universal Serial Bus (USB)).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1640, such as, location via Internet Protocol (IP) geo-location, location via Wi-Fi® signal triangulation, location via detecting an NFC beacon signal that may indicate a particular location, and so forth.

Although the foregoing example embodiments have been described in some detail for purposes of clarity of understanding, it will be apparent that certain changes and modifications can be practiced within the scope of the appended claims. Accordingly, the present example embodiments are to be considered as illustrative and not restrictive, and the example embodiments are not to be limited to the details given herein, but may be modified within the scope and equivalents of the appended claims.

What is claimed is:

1. A method comprising:
   receiving at a server, from a client device, a request for an update to a user interface (UI) of the client device, the request being part of a single call to one orchestrator for multiple domain services, the one orchestrator at the server;
   determining, based on the request, by the one orchestrator, one or more modules of the UI;
   invoking, by the orchestrator, one or more domain services of the multiple domain services based on the determined modules, each domain service of the one or more domain services returning respective domain service data;
   synthesizing the domain service data returned by the one or more domain services to generate module data for each module, the synthesizing including selecting selected domain service data from the domain service data and combining the selected domain service data to generate the module data; and
   transmitting to the client device the module data for updating the modules of the UI.

2. The method as recited in claim 1, wherein the determining of the one or more modules further includes:
   selecting an entry in a module selection table based on the request, wherein the module selection table includes a plurality of fields that include a marketplace field, a device type field, and a modules field; and
   selecting the modules identified in the modules field of the selected entry.

3. The method as recited in claim 2, wherein the plurality of fields in the module selection table further include a view field, a user-segment field, and an experimentation field.

4. The method as recited in claim 2, wherein the determining the one or more modules further includes:
   detecting a device type and a device-operating-system type based on the request, wherein the selecting the entry of the module selection table is based on the detected device type and device-operating-system type.

5. The method as recited in claim 1, further including:
   detecting an error returned by one of the domain services; and
   performing error recovery at the server based on the detected error.

6. The method as recited in claim 1, wherein the one or more domain services include one or more of a user-information service, a marketplace service, a seller information service, a search service, and a messaging service.

7. The method as recited in claim 1, wherein the synthesizing the domain service data further includes:
   identifying data from the domain service data needed for generating the module data; and
   extracting the identified data, wherein domain service data unnecessary for the generating the module data is not transmitted to the client device.

8. The method as recited in claim 1, wherein a first module is presentable on two or more client device types, wherein the synthesizing the domain service data includes creating the module data for the first module based on the two or more client device types.

9. The method as recited in claim 1, wherein a second module is configured to present on the UI of the client device an item for sale, wherein the module data for the second module includes an image of the item for sale, a price of the item for sale, and a description of the item for sale.

10. The method as recited in claim 1, wherein the server further includes an experimentation component, the method further including:
    sending, from the experimentation component at the server to the client device, experimentation data identifying an experiment for the client device, wherein the experimentation data is transmitted to the client device to test a service feature.

11. A server comprising:
    a communications interface for receiving a request for an update to a user interface (UI) of a client device;

a memory including instructions of an orchestrator program; and one or more computer processors, wherein the instructions, when executed by the one or more computer processors, cause the one or more computer processors to perform operations comprising:

determining one or more modules based on the request and a module selection table stored in the memory, each module being part of the UI;

invoking one or more domain services based on the determined modules, each domain service returning respective domain service data;

synthesizing the domain service data returned by the one or more domain services to generate module data for each module, the module data for each module defined by a respective data structure for said each module, the synthesizing including:

selecting selected domain service data from the domain service data;

combining the selected domain service data to form combined domain service data; and formatting the combined domain service data according to the respective data structure for said each module; and transmitting, via the communications interface, to the client device the module data for updating the modules of the UI.

12. The server as recited in claim 11, wherein the instructions cause the one or more processors to perform operations comprising:

selecting an entry in the module selection table based on the request, wherein the module selection table includes a plurality of fields that include a marketplace field, a device type field, and a modules field; and selecting the modules identified in the modules field of the selected entry.

13. The server as recited in claim 12, wherein the plurality of fields in the module selection table further include a view field, a user-segment field, and an experimentation field.

14. The server as recited in claim 11, wherein the memory further includes instructions of an error-detection-and-recovery program, wherein the instructions for the error-detection-and-recovery program, when executed by the one or more computer processors, cause the one or more computer processors to perform operations comprising:

detecting an error returned by any of the domain services; and performing recovery based on the detected error.

15. The server as recited in claim 11, wherein the memory further includes instructions of a user behavior tracking program, wherein the instructions for the user behavior tracking program, when executed by the one or more computer processors, cause the one or more computer processors to perform operations comprising:

sending user behavior data to the client device for tracking user behavior at the client device.

16. The server as recited in claim 11, wherein the memory further includes instructions of a localization program, wherein the instructions for the localization program, when executed by the one or more computer processors, cause the one or more computer processors to perform operations comprising:

localizing the module data before transmitting the module data.

17. A non-transitory machine-readable medium including a set of instructions that, when executed by a machine, causes the machine to perform a set of operations including:

receiving at a server, from a client device, a request for an update to a user interface (UI) of the client device;

determining, based on the request by an orchestrator at the server, one or more modules of the UI, the determining including:

selecting an entry in a module selection table based on the request, the module selection table including a plurality of fields that include a marketplace field, a device type field, and a modules field; and selecting modules to be invoked according to modules identified in the modules field of the entry selected in the module selection table;

invoking, by the orchestrator, one or more domain services based on the modules selected to be invoked, each domain service returning respective domain service data;

synthesizing the domain service data returned by the one or more domain services to generate module data for each module, the synthesizing including selecting selected domain service data from the domain service data and combining the selected domain service data to generate the module data; and transmitting to the client device the module data for updating the modules of the UI.

18. The machine-readable medium as recited in claim 17, wherein the plurality of fields in the module selection table further include a view field, a user-segment field, and an experimentation field.

19. The machine-readable medium as recited in claim 17, wherein the determining of the one or more modules further includes:

detecting a device type and device-operating-system type based on the request, wherein the entry of the module selection table is selected based on the detected device type and device-operating-system type.

20. The machine-readable medium as recited in claim 17, wherein the domain services include one or more of a user-information service, a marketplace service, a seller information service, a search service, and a messaging service.

* * * * *